United States Patent
Johnson et al.

(10) Patent No.: US 10,402,553 B1
(45) Date of Patent: Sep. 3, 2019

(54) SYSTEM AND METHOD FOR USING IMAGES TO AUTHENTICATE A USER

(71) Applicant: Capital One Services, LLC, McLean, VA (US)

(72) Inventors: Clayton Johnson, Edgewood, MD (US); Lawrence Douglas, McLean, VA (US); Yolanda Liu, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/050,218

(22) Filed: Jul. 31, 2018

(51) Int. Cl.
*G06F 21/32* (2013.01)
*G06K 9/00* (2006.01)
*G06K 9/62* (2006.01)
*G06Q 20/40* (2012.01)
*G06T 15/00* (2011.01)

(52) U.S. Cl.
CPC ......... *G06F 21/32* (2013.01); *G06K 9/00288* (2013.01); *G06K 9/00315* (2013.01); *G06K 9/00335* (2013.01); *G06K 9/00906* (2013.01); *G06K 9/6212* (2013.01); *G06Q 20/40145* (2013.01); *G06F 2221/2133* (2013.01); *G06T 15/00* (2013.01)

(58) Field of Classification Search
None
See application file for complete search history.

(56) References Cited

U.S. PATENT DOCUMENTS

| | | | | |
|---|---|---|---|---|
| 8,316,086 | B2* | 11/2012 | Ufford | G06Q 10/107 705/319 |
| 8,670,597 | B2* | 3/2014 | Petrou | G06K 9/00288 382/116 |
| 9,147,117 | B1* | 9/2015 | Madhu | H04L 63/0861 |
| 2009/0234842 | A1* | 9/2009 | Luo | G06F 17/30247 |

(Continued)

FOREIGN PATENT DOCUMENTS

| WO | WO2011017653 | * | 2/2011 |
|---|---|---|---|
| WO | WO2012087412 | * | 6/2012 |

OTHER PUBLICATIONS

Kasturi More et al, International Journal of Computer Science and Mobile Computing, vol. 4 Issue.3, Mar. 2015, p. 430-433.*

(Continued)

*Primary Examiner* — Abhishek Vyas
(74) *Attorney, Agent, or Firm* — Finnegan, Henderson, Farabow, Garrett & Dunner LLP

(57) ABSTRACT

Systems and methods for authenticating a user, the method including receiving an image of a user of a device, identifying a first facial descriptor of the user from the received image and from previously captured images of the user, and determining a difference between the first facial descriptor from the received image and that from the previously captured images. The method further includes identifying a second facial descriptor of a non-user from the previously captured images of the user, and applying facial recognition to images stored in a plurality of second social networking profiles associated with a first social networking profile of the user to identify the second facial descriptor from the (Continued)

images stored in the second social networking profiles. Based on the difference and the second facial descriptor, the user may be authenticated.

20 Claims, 10 Drawing Sheets

(56) References Cited

U.S. PATENT DOCUMENTS

| | | | | |
|---|---|---|---|---|
| 2010/0135584 A1* | 6/2010 | Tang | ................ | G06F 17/30247 |
| | | | | 382/218 |
| 2010/0272363 A1* | 10/2010 | Steinberg | ........... | G06K 9/00228 |
| | | | | 382/190 |
| 2013/0015946 A1* | 1/2013 | Lau | ......................... | G07C 9/00 |
| | | | | 340/5.2 |
| 2013/0077835 A1* | 3/2013 | Kritt | ................. | G06K 9/00288 |
| | | | | 382/118 |
| 2015/0073985 A1* | 3/2015 | Hadinata | .......... | G06Q 20/40145 |
| | | | | 705/44 |

OTHER PUBLICATIONS

Sakshi Jain et al, New Directions in Social Authentication; USEC '15, Feb. 8, 2015, San Diego, CA, USA Copyright 2015 Internet Society, ISBN 1-891562-40-1.*
An Introduction to Face Recognition Technology; Shang-Hung Lin,Informing Science Special Issue, vol. 3, No. 1, 2000.*
A.K. Jain et al. / Pattern Recognition Letters 79 (2016) 80-105.*
Image Labeling on a Network; Julian McAuley and Jure Leskovec; Mar. 2012 (Year: 2012).*
Social Snapshots: Digital Forensics for Online Social Networks; Huber, Mulazzani, Leithner et al; Dec. 2011 (Year: 2011).*

* cited by examiner

SYSTEM AND METHOD FOR USING IMAGES TO AUTHENTICATE A USER

TECHNICAL FIELD

The present disclosure relates to systems and methods for using images to authenticate a user.

BACKGROUND

Conventional systems and methods for authentication may apply facial recognition to the user's image. For example, users are asked to capture images of themselves and the images are processed and analyzed by processors on mobile devices. The processors may apply facial recognition algorithms to the images. However, with rapid developments in technology, existing ways of authentication are not robust enough to protect against data vulnerability. For example, a fake user may hack an authentication mechanism that applies facial recognition by capturing an image of a picture of the user's face. The authentication mechanism may then recognize the user's face in the picture and allow the fake user access to personal information.

In view of such deficiencies, there exists a need for improved and more robust systems and methods for authentication of users.

SUMMARY

In accordance with the present disclosure, a computer-implemented method of authenticating a user is provided. The method may comprise receiving an image of a user of a device, identifying a first facial descriptor of the user from the received image, identifying the first facial descriptor of the user from a plurality of previously captured images of the user stored in the device, determining a difference between the first facial descriptor from the received image and the first facial descriptor from the previously captured images, identifying a second facial descriptor of a non-user from the previously captured images of the user stored in the device, applying facial recognition to images stored in a plurality of second social networking profiles associated with a first social networking profile of the user to identify the second facial descriptor from the images stored in the second social networking profiles, and generating, based on at least the difference and the identified second facial descriptor, a notification indicative of whether the user in the received image is an authorized user.

In another embodiment, the method may further comprise generating a notification that the user in the received image is an authorized user when the difference between the first facial descriptor from the previously captured images and the first facial descriptor from the received image is lower than a predetermined threshold. The notification may comprise at least one of a visual notification or an audible notification. In some embodiments, generating the notification may further comprise at least one of unlocking the device, enabling the user to access contents stored in the device, or enabling the user to perform a financial transaction.

In other embodiments, the method may further comprise enabling the user to perform a financial transaction when the difference is lower than the predetermined threshold. The predetermined threshold may vary based on a type of financial transaction requested by the user. In some embodiments, the at least one of the first facial descriptor or the second facial descriptor may include at least one of an eye, a nose, or a mouth of the user.

In other embodiments, determining the difference between the first facial descriptor from the received image and the first facial descriptor from the previously captured images may further comprise generating a first color histogram of the first facial descriptor from the received image, and comparing the first color histogram to second color histograms of the first facial descriptor from the previously captured images. In yet another embodiment, determining the difference between the first facial descriptor from the received image and the first facial descriptor from the previously captured images further comprises aligning the first facial descriptor from the received image with the first facial descriptor from the previously captured images. In some aspects, the difference between the first facial descriptor from the received image and the first facial descriptor from the previously captured images is weighted higher than the identified second facial descriptor to determine whether the user in the received image is an authorized user.

In some embodiments, the method may further comprise evaluating a liveness of the user by requesting the user to make a predetermined facial expression, capturing a second image of the user while the user is making the predetermined facial expression, and performing a three-dimensional (3D) rendering of the second image.

According to another embodiment of the present disclosure, a computer-implemented method of authenticating a user is provided. The method may comprise receiving a video of a user of a device, separating the video into a plurality of image frames of the user, identifying a first facial descriptor of the user from the image frames, identifying the first facial descriptor of the user from a plurality of previously captured images of the user stored in the device, determining a difference between the first facial descriptor from the image frames and the first facial descriptor from the previously captured images, identifying a second facial descriptor of a non-user from the previously captured images of the user stored in the device, applying facial recognition to images stored in a plurality of second social networking profiles associated with a first social networking profile of the user to identify the second facial descriptor from the images stored in the second social networking profiles, and generating, based on at least the difference and the identified second facial descriptor, a notification indicative of whether the user in the received video is an authorized user.

In another embodiment, the method may further comprise generating a notification that the user in the video is an authorized user when the difference between the first facial descriptor from the previously captured images and the first facial descriptor from the image frames is lower than a predetermined threshold. In some embodiments, generating the notification may further comprise at least one of unlocking the device, enabling the user to access contents stored in the device, or enabling the user to perform a financial transaction.

In other embodiments, the method may further comprise enabling the user to perform a financial transaction when the difference is lower than the predetermined threshold. The predetermined threshold may vary based on a type of financial transaction requested by the user. In some embodiments, the at least one of the first facial descriptor or the second facial descriptor may include at least one of an eye, a nose, or a mouth of the user.

In other embodiments, determining the difference between the first facial descriptor from the image frames and the first facial descriptor from the previously captured images may further comprise generating a first color histogram of the first facial descriptor from the image frames, and comparing the first color histogram to second color histograms of the first facial descriptor from the previously captured images. In yet another embodiment, determining the difference between the first facial descriptor from the image frames and the first facial descriptor from the previously captured images further comprises aligning the first facial descriptor from the image frames with the first facial descriptor from the previously captured images.

In some embodiments, the method may further comprise evaluating a liveness of the user by requesting the user to perform a predetermined motion, recording a second video of the user while the user is performing the predetermined motion, separating the second video into a plurality of second image frames, and performing a three-dimensional (3D) rendering of the second image frames. The predetermined motion may include at least one of a predetermined head movement or a predetermined facial expression.

According to another embodiment of the present disclosure, a system for authenticating a user is provided. The system may comprise at least one processor and at least one memory storing instructions. The instructions may cause the processor to perform operations comprising receiving an image of a user of a device, identifying a first facial descriptor of the user from the received image, identifying the first facial descriptor of the user from a plurality of previously captured images of the user stored in the device, determining a difference between the first facial descriptor from the received image and the first facial descriptor from the previously captured images, identifying a second facial descriptor of a non-user from the previously captured images of the user stored in the device, applying facial recognition to images stored in a plurality of second social networking profiles associated with a first social networking profile of the user to identify the second facial descriptor from the images stored in the second social networking profiles, and generating, based on at least the difference and the identified second facial descriptor, a notification indicative of whether the user in the received image is an authorized user.

According to another embodiment of the present disclosure, a computer-implemented method of authenticating a user is provided. The method may comprise receiving an image of a user of a device, identifying at least one facial descriptor of the user from the received image, identifying at least one facial descriptor of the user from a plurality of previously captured images of the user stored in the device, determining a difference between the at least one facial descriptor from the received image and the at least one facial descriptor from the previously captured images, cross-verifying the received image against a plurality of images of the user stored in a social networking profile of the user, cross-verifying the received image against a plurality of images of the user stored in a social networking profile of a non-user, the social networking profile of the non-user being associated with the social networking profile of the user, and generating, based on at least the determined difference and the cross-verifications, a notification indicative of whether the user in the received image is an authorized user.

In some embodiments, the method may further comprise generating a notification that the user in the received image is an authorized user when the difference between the at least one facial descriptor from the previously captured images and the at least one facial descriptor from the received image is lower than a predetermined threshold. The at least one facial descriptor of the user may comprise at least one of an eye, a nose, or a mouth of a user. The notification may comprise at least one of a visual notification or an audible notification. In some embodiments, generating the notification may further comprise at least one of unlocking the device, enabling the user to access contents stored in the device, or enabling the user to perform a financial transaction. In some embodiments, enabling the user to perform a financial transaction when the difference is lower than the predetermined threshold. The predetermined threshold may vary based on a type of financial transaction requested by the user.

In some embodiments, determining the difference between the at least one facial descriptor from the received image and the at least one facial descriptor from the previously captured images may comprise generating a first color histogram of the at least one facial descriptor from the received image, and comparing the first color histogram with second color histograms of the at least one facial descriptor from the previously captured images. In other embodiments, determining the difference between the at least one facial descriptor from the received image and the at least one facial descriptor from the previously captured images may comprise aligning the at least one facial descriptor from the received image to the at least one facial descriptor from the previously captured images.

In another embodiment, the method may further comprise evaluating a liveness of the user by requesting the user to make a predetermined facial expression, capturing a second image of the user while the user is making the predetermined facial expression, and performing a three-dimensional (3D) rendering of the second image. In other embodiments, cross-verifying the received image may comprise aggregating social networking profiles of non-users associated with the social networking profile of the user, performing facial recognition on images of the user stored in the non-user social networking profiles to identify the at least one facial descriptor of the user, calculating, based on the facial recognition performed, a number of images in which the at least one facial descriptor of the user was identified, and authenticating the user when the number exceeds a predetermined threshold.

According to another embodiment of the present disclosure, a computer-implemented method of authenticating a user is provided. The method may comprise receiving a video of a user of a device, separating the video into a plurality of image frames of the user, identifying at least one facial descriptor of the user from the image frames, identifying at least one facial descriptor of the user from a plurality of previously captured images of the user stored in the device, determining a difference between the at least one facial descriptor from the image frames and the at least one facial descriptor from the previously captured images, cross-verifying the image frames against a plurality of images of the user, cross-verifying the image frames against a plurality of images of the user stored in a social networking profile of a non-user, the social networking profile of the non-user being associated with the social networking profile of the user, and generating, based on at least the determined difference and the cross-verifications, a notification indicative of whether the user in the received video is an authorized user.

In some embodiments, the method may further comprise generating a notification that the user in the video is an authorized user when the difference between the at least one facial descriptor from the previously captured images and the at least one facial descriptor from the image frames is lower than a predetermined threshold. The at least one facial descriptor of the user may comprise at least one of an eye, a nose, or a mouth of a user. In some embodiments, generating the notification may further comprise at least one of unlocking the device, enabling the user to access contents stored in the device, or enabling the user to perform a financial transaction. In some embodiments, enabling the user to perform a financial transaction when the difference is lower than the predetermined threshold. The predetermined threshold may vary based on a type of financial transaction requested by the user.

In some embodiments, determining the difference between the at least one facial descriptor from the image frames and the at least one facial descriptor from the previously captured images may comprise generating a first color histogram of the at least one facial descriptor from the image frames, and comparing the first color histogram with second color histograms of the at least one facial descriptor from the previously captured images. In other embodiments, determining the difference between the at least one facial descriptor from the image frames and the at least one facial descriptor from the previously captured images may comprise aligning the at least one facial descriptor from the image frames with the at least one facial descriptor from the previously captured images.

In another embodiment, the method may further comprise evaluating a liveness of the user by requesting the user to perform a predetermined motion, recording a second video of the user while the user is performing the predetermined motion, separating the second video into a plurality of second image frames, and performing a three-dimensional (3D) rendering of the second image frames. The predetermined motion may comprise at least one of a predetermined head movement or a predetermined facial expression.

According to another embodiment of the present disclosure, a system for authenticating a user is provided. The system may comprise at least one processor and at least one memory storing instructions. The instructions may cause the processor to perform operations comprising receiving an image of a user of a device, identifying a facial descriptor of the user from the received image, identifying a facial descriptor of the user from a plurality of previously captured images of the user stored in the device, determining a difference between the facial descriptor from the received image and the facial descriptor from the previously captured images, cross-verifying the received image against a plurality of images of the user stored in a social networking profile of the user, cross-verifying the received image against a plurality of images of the user stored in a social networking profile of a non-user, the social networking profile of the non-user being associated with the social networking profile of the user, and generating, based on at least the determined difference and the cross-verifications, a notification indicative of whether the user in the received image is an authorized user.

Additional features and advantages of the embodiments of the present disclosure will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this present disclosure, illustrate disclosed embodiments of the present disclosure and, together with the description, serve to explain the principles of the present disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. The disclosed embodiments include systems and methods for using images to authenticate a user. It should be appreciated, however, that the present disclosure is not limited to these specific embodiments and details, which are exemplary only. It is further understood that one possessing ordinary skill in the art, in light of known systems and methods, would appreciate the use of the embodiments of the present disclosure for its intended purposes and benefits in any number of alternative embodiments, depending on specific design and other needs. A financial institution and system supporting a financial institution are used as examples for the disclosure. However, the disclosure is not intended to be limited to financial institutions only.

The embodiments of the present disclosure relate to systems and methods for applying facial recognition to acquired image(s) of the user, previously captured image(s) of the user, previously captured image(s) of non-user(s), image(s) stored in a social networking profile of the user, and/or image(s) stored in social networking profile(s) of non-user(s) associated with the user. Based on facial descriptors identified in the images, via facial recognition, a notification may be generated that is indicative of whether the user in the acquired image is an authorized user.

Systems and methods according to the present disclosure may use images of the user in conjunction with the user's social media account or profile for authentication. Using the user's social media account in conjunction with the images of the user may improve accuracy and reliability of authentication. For example, such systems and methods may establish trust between the device of the user and the user's social network identity. In addition, such systems and methods may identify not only the users but also non-users in the acquired or stored images. The faces of non-users may be identified in the images and matched to corresponding social network profiles of the non-users. Thus, such systems and methods may provide an additional level of security, through which the user's identity can be cross-verified using social networking profiles of the user's connections (non-users). Since a cloned social networking profile is unlikely to have the same network of connections as the original social networking profile, the systems and methods in accordance with the present disclosure will provide user protection against fake users.

Figure 1:
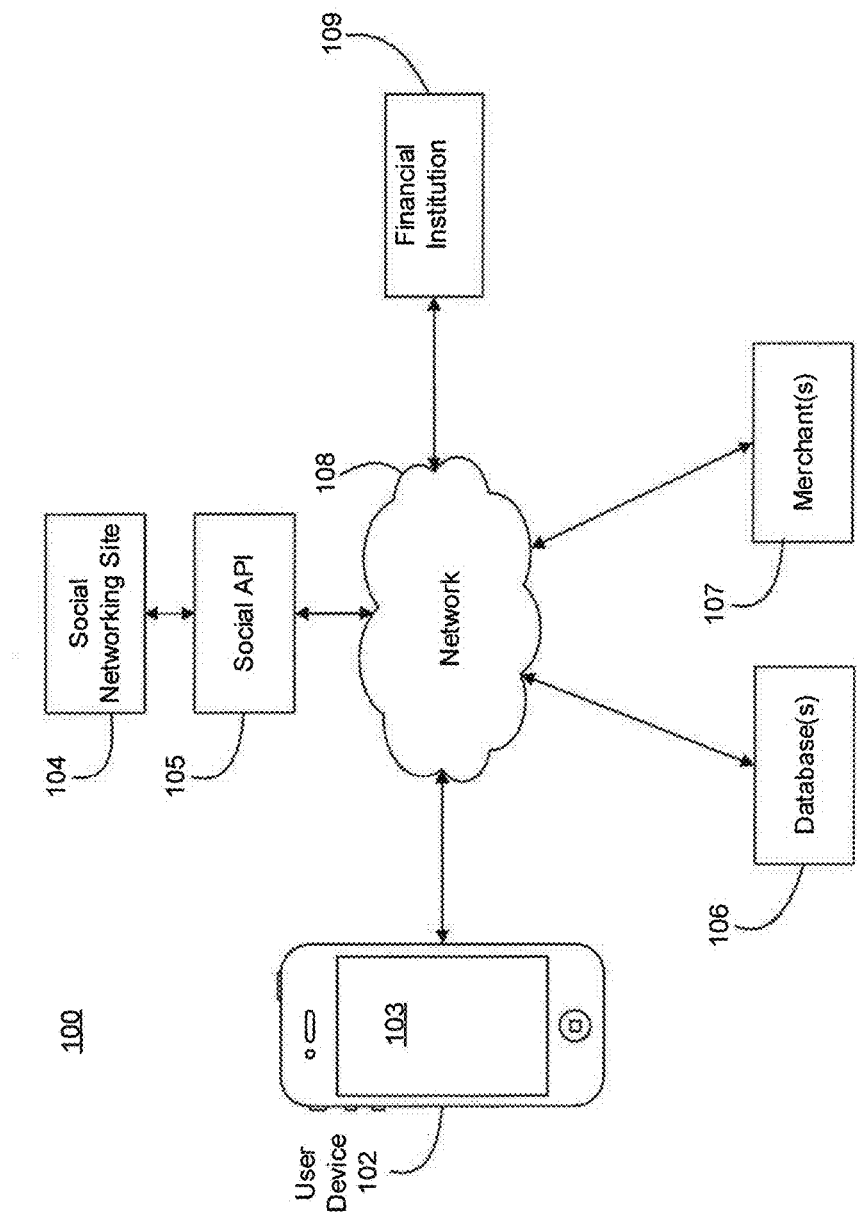
FIG. 1 shows an exemplary schematic diagram of a system for authenticating users, in accordance with embodiments of the present disclosure.

FIG. 1 depicts an exemplary system 100 for authenticating users according to various embodiments of the disclosure. The system 100 is configured as a network-enabled computer systems and includes, as depicted in FIG. 1, for example, a user device 102, including a graphical user interface 103, a social networking site 104, a social application programming interface (API) 105, database(s) 106, merchant(s) 107, a network 108, and a financial institution 109.

User device 102 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, an ultra book, or other device. User device 102 may also be a tablet computer. Non-limiting examples of a tablet computer include an iPad, Kindle Fire, Playbook, Touchpad, and the like. User device 102 may be associated with an account holder having one or more financial accounts with financial institution 109. User device 102 may be associated with an account holder having one or more social networking profiles with one or more social networking site(s) 104.

In various exemplary embodiments, an account holder may be any user or entity that desires to conduct a financial transaction using one or more accounts held at one or more financial account providers, such as financial institution 109. Also, an account holder may be a computer system associated with or operated by such a user or entity. An account may include any place, location, object, entity, or other mechanism for holding money or performing transactions in any form, including, without limitation, electronic form. An account may be, for example, a social networking account, a credit card account, a prepaid card account, stored value card account, debit card account, check card account, payroll card account, gift card account, prepaid credit card account, charge card account, checking account, rewards account, line of credit account, credit account, mobile device account, or mobile commerce account. A social networking account may be unrelated to any financial account(s) or financial account providers. A financial account provider may be, for example, a bank, other type of financial account provider, including a credit card provider, for example, or any other entity that offers accounts to customers. An account may or may not have an associated card, such as, for example, a credit card for a credit account or a debit card for a debit account. The account card may be associated or affiliated with one or more social networking sites, such as a co-branded credit card.

Graphical user interface (GUI) 103 may be displayed on user device 102. GUI 103 may access services provided by one or more processor(s) in user device 102. The services may include a social networking app. User device 102 may access the social networking profile of the user using the GUI 103 provided by, for example, social networking site 104. When the user first launches the social networking app on user device 102, GUI 103 may prompt the user to authenticate himself/herself. The user may be prompted to provide a username and password for the user's social networking profile. The user may also be prompted to provide authentication when accessing user device 102. For example, user device 102 may be in a locked state, in which the user has no access to services provided by one or more processor(s) in user device 102. Once the user is recognized as an authorized user, the user may be able to access the services, including the social networking app.

As used herein, social networking site 104 comprises a website that allows a user to create an account and provide user-specific information, including interests, and network with other users based on social connections. Examples of social networking sites include, without limitation, Facebook, Instagram, Google+, LinkedIn, Twitter, Pintrest, Yelp, Foursquare, or the like. Social networking site 104 may house social media profiles holding social media data for one or more account holders, such as, for example, user name, user phone number, user address, user email address, user occupation, user location information, user photos or images, images in which the user is tagged, and/or other information. A social networking profile of the user may be associated with one or more social networking profiles of other users ("non-users"). For example, social networking site 104 may allow the user to accept or deny requests from other non-users to be connected on social networking site 104. Once the user accepts such a request from other non-users, the social networking profiles of other non-users may be associated with the social networking profile of the user. As such, other social networking profiles of other non-users associated with the user may be displayed on the social networking profile of the user. Once one or more social networking profiles are associated or connected in social networking site 104, the user and other non-users may be able to share and access information, such as images, videos, messages, recommendations, or the like, using their social networking profiles.

User device 102 is able to exchange data with social networking site 104 via social application programming interface (API) 105. The user may use the user device 102 to grant one or more processor(s) in user device 102 permission to link to the user's social networking profile on social networking site 104 (for example, by providing a username and password associated with the user's social networking profile(s)). One or more processor(s) in user device 102 may link to the user's social networking profile(s) using one or more APIs, such as social API 105. Social API 105 may allow certain data to be transmitted so that social networking site 104 can communicate with user device 102. Social API 105 may prevent data other than approved data from being transmitted. For example, the API may only support user name, user e-mail address, user identification information, user location information, user images, and/or user videos to be transmitted from social networking site 104 to user device 102.

Social API 105 may provide encryption and filtering functionality to prevent, for example, identity theft and fraudulent transactions. For example, social API 105 may filter out certain personally identifying information, such as, social security numbers. Social API 105 may also encrypt, for example, account and routing numbers to ensure that any passing account identifying data is secure during transmission and storage.

System 100 also includes database(s) 106 which may include one or more memory devices that store information and are accessed through network 108. By way of example, database 106 may include Oracle™ databases, Sybase™ databases, or other relational databases or non-relational databases, such as Hadoop sequence files, HBase, or Cassandra. Database 106 may include, for example, the user's credentials, images taken by the user, videos recorded by the user, social networking profiles of the user, transaction history of the user, information related to one or more items purchased or selected for purchase by the user, financial information related to one or more financial accounts of the user, and/or other information associated with the user, etc. Additionally or alternatively, the data stored in database 106 may take or represent various forms including, but not limited to, images, video files, documents, presentations, spreadsheets, textual content, mapping and geographic information, rating and review information, pricing information, address information, profile information, audio files, and a variety of other electronic data, or any combination thereof.

While database 106 is illustrating as being included in the system 100, it may alternatively be located remotely from system 100. Database 106 may include computing components (e.g., database management system, database server, etc.) configured to receive and process requests for data stored in memory devices of database 106 and to provide data from database 106.

Merchant(s) 107 may be an entity that offers goods, services, and/or information, such as a retailer (e.g., Macy's®, Target®, etc.), grocery store, ride-sharing or transportation provider, service provider (e.g., utility company, etc.), or any other type of entity that offers goods, services, and/or information that consumers (not shown) may purchase, consume, use, etc. Merchant 107 may offer for sale one or more products or one or more services. In one example, merchant 107 may be associated with brick and mortar location(s) that a consumer may physically visit and purchase a product or service. Merchant 107 may also include back- and/or front-end computing components that store data and execute software instructions to perform operations consistent with disclosed embodiments, such as computers that are operated by employees of the merchant (e.g., back office systems, etc.).

Merchant 107 may include point-of-sale terminals, tablets, personal digital assistants, personal computers, laptop computers, desktop computers, smartphones, netbooks and/or other types of electronics or communication devices. In some exemplary embodiments, merchant 107 may comprise one or more processor(s) configured to facilitate and/or perform transactions, for example, sale of one or more merchandise items to one or more customers in a store. One or more processor(s) associated with merchant 107 may prompt the user to provide authentication prior to providing one or more goods or one or more services to the user.

In other exemplary embodiments, merchant 107 may include one or more servers or other types of computer devices configured to execute software instructions stored in memory to perform one or more processes consistent with the disclosed embodiments. For example, merchant 107 may include one or more memory device(s) storing data and software instructions and one or more processor(s) configured to use the data and execute the software instructions to perform server-based functions and operations known to those skilled in the art. Merchant 107 may include server(s) that are configured to execute stored software instructions to perform operations associated with merchant 107, including one or more processes associated with processing purchase transactions, generating transaction data, generating product data (e.g., SKU data) relating to purchase transactions, etc.

Merchant 107 may include one or more servers that are, for example, mainframe computers, one or more web servers, one or more application servers, one or more database servers, or any combination of these components. In certain embodiments, merchant 107 may comprise a particular apparatus, system, and the like based on the storage, execution, and/or implementation of the software instructions that perform one or more operations consistent with the disclosed embodiments. A merchant server may be standalone, or it may be part of a subsystem, which is part of a larger system. For example, a merchant server associated with the merchant 107 may represent distributed servers that are remotely located and communicate over a network (e.g., network 108) or a dedicated network, such as a LAN. In certain aspects, merchant 107 may include one or more web servers that execute software that generates, maintains, and provides web site(s) for a respective merchant 107 that is accessible over network 108. In other aspects, merchant 107 may connect separately to web server(s) or similar computing devices that generate, maintain, and provide web site(s) for a merchant.

The components depicted in system 100 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, but not be limited to, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

Financial institution 109 may be an entity that provides financial services. For example, financial institution 109 may be a bank, credit card issuer, or other type of financial service entity that generates, provides, manages, and/or maintains financial service accounts for one or more users. Financial service accounts may include, for example, credit card accounts, loan accounts, checking accounts, savings accounts, reward accounts, and any other types of financial service account known to those skilled in the art. Financial institution 109 may include infrastructure and components that are configured to generate and provide financial service accounts such as credit card accounts, checking accounts, debit card accounts, lines of credit, and the like.

In one embodiment, financial institution 109 may include one or more computing systems that are configured to execute software instructions stored on one or more memory devices to perform one or more operations consistent with the disclosed embodiments. In one embodiment, financial institution 109 may include a server (not shown). The server may be one or more computing devices configured to execute software instructions stored in memory to perform one or more processes consistent with the disclosed embodiments. For example, the server may include one or more memory device(s) storing data and software instructions and one or more processor(s) configured to use the data and execute the software instructions to perform server-based functions and operations known to those skilled in the art. The server may also be configured to execute stored software instructions to perform social discovery service operations consistent with the disclosed embodiments. The server may be a general purpose computer, a mainframe computer, or any combination of these components. In certain embodiments, the server may be configured as a particular apparatus, system, and the like based on the storage, execution, and/or implementation of the software instructions that perform one or more operations consistent with the disclosed embodiments. The server may be standalone, or it may be part of a subsystem, which may be part of a larger system. For example, the server may represent distributed servers that are remotely located and communicate over a network (e.g., network 108) or a dedicated network, such as a LAN, for financial institution 109.

The server may include or may connect to one or more storage devices configured to store data and/or software instructions used by one or more processors of the server to perform operations consistent with disclosed embodiments. For example, the server may include memory configured to store one or more software programs that performs several functions when executed by a processor. The disclosed embodiments are not limited to separate programs or computers configured to perform dedicated tasks. For example, the server may include memory that stores a single program or multiple programs. Additionally, the server may execute one or more programs located remotely from the server. For example, the server may access one or more remote programs stored in memory included with a remote component that, when executed, perform operations consistent with the disclosed embodiments. In certain aspects, the server may include web server software that generates, maintains, and provides web site(s) that are accessible over network 108. In other aspects, financial institution 109 may connect separate web server(s) or similar computing devices that generate, maintain, and provide web site(s) for financial institution 109.

Figure 2:
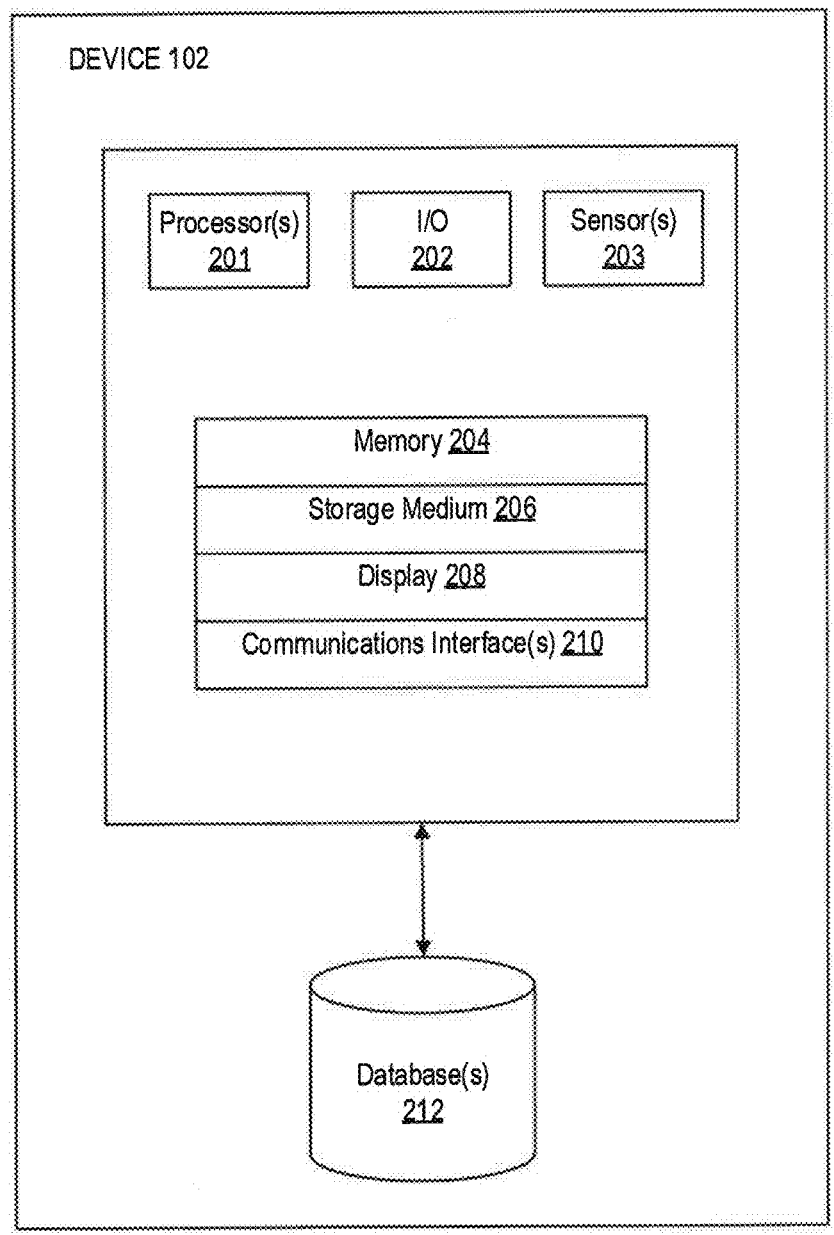
FIG. 2 shows an exemplary schematic diagram of a device used to authenticate users, in accordance with embodiments of the present disclosure.

FIG. 2 depicts an exemplary user device 102 for authenticating the user. As shown in FIG. 2, device 102 includes one or more processor(s) 201 for executing instructions. Device 102 also includes one or more input/output (I/O) devices 202. By way of example, I/O devices 202 may include physical keyboards, virtual touch-screen keyboards, mice, joysticks, styluses, etc. In certain exemplary embodiments, I/O devices may include one or more sensors (not shown) for providing input to user device 102 using, for example, facial recognition, voice recognition, speech-to-text, voice command applications, and/or camera applications. In other exemplary embodiments, I/O devices may include a telephone keypad and/or a keypad on a touch-screen for providing input to user device 102. In yet other exemplary embodiments, input may be provided to user device 102 in the form of images captured, videos recorded, or spoken information provided by a user associated with user device 102.

In addition, user device 102 includes one or more sensor(s) 203. Sensor(s) 203 may include one or more image sensors, one or more audio sensors, or any other types of sensors configured to capture images of a user or record videos of a user. For example, sensor(s) may include one or more cameras. As further illustrated in FIG. 2, user device 102 includes memory 204 configured to store data or one or more instructions and/or software programs that perform functions or operations when executed by the one or more processors 201. By way of example, memory 204 may include Random Access Memory (RAM) devices, NOR or NAND flash memory devices, Read Only Memory (ROM) devices, etc. User device 102 may also include storage medium 206 configured to store data or one or more instructions and/or software programs that perform functions or operations when executed by the one or more processors 201. By way of example, storage medium 206 may include hard drives, solid state drives, tape drives, RAID arrays, compact discs (CDs), digital video discs (DVDs), Blu-ray discs (BD), etc. Although FIG. 2 shows only one memory 204 and one storage medium 206, user device 102 may include any number of memories 204 and storage media 206. Further, although FIG. 2 shows memory 204 and storage medium 206 as part of user device 102, memory 204 and/or storage medium 206 may be located separately or remotely and user device 102 may be able to access memory 204 and/or storage medium 206 via a wired or wireless connection (e.g., network 108).

User device 102 includes one or more displays 208 for displaying data and information. Display 208 may be implemented using devices or technology, such as a cathode ray tube (CRT) display, a liquid crystal display (LCD), a plasma display, a light emitting diode (LED) display, a touch screen type display, a projection system, and/or any other type of display known in the art.

User device 102 includes one or more communications interfaces 210. Communications interface 210 may allow software and/or data to be transferred between user device 102, database 106, social networking site 104, social API 105, merchant(s) 107, financial institution 109, and/or other components. Examples of communications interface 210 may include a modem, a network interface (e.g., an Ethernet card or a wireless network card), a communications port, a PCMCIA slot and card, a cellular network card, etc. Communications interface 210 may transfer software and/or data in the form of signals, which may be electronic, electromagnetic, optical, or other signals capable of being transmitted and received by communications interface 210. Communications interface 210 may transmit or receive these signals using wire, cable, fiber optics, radio frequency ("RF") link, Bluetooth link, and/or other communications channels.

User device 102 may include one or more databases 212. In some embodiments, one or more databases 212 may be located remotely from the user device 102, and user device 102 may be configured to communicate with one or more databases 212 via network 108. Database 212 may include one or more logically and/or physically separate databases configured to store data. The data stored in database 212 may be received from user device 102, social networking site 104, social API 105, merchant(s) 107, financial institution 109, and/or may be provided as input using conventional methods (e.g., data entry, data transfer, data uploading, etc.).

Similar to database(s) 106, database(s) 212 may, for example, include Oracle™ databases, Sybase™ databases, or other relational databases or non-relational databases, such as Hadoop sequence files, HBase, or Cassandra. Database 212 may include, for example, the user's credentials, images taken by the user, videos recorded by the user, social networking profiles of the user, transaction history of the user, information related to one or more items purchased or selected for purchase by the user, financial information related to one or more financial accounts of the user, and/or other information associated with the user, etc. Additionally or alternatively, the data stored in database 212 may take or represent various forms including, but not limited to, images, video files, documents, presentations, spreadsheets, textual content, mapping and geographic information, rating and review information, pricing information, address information, profile information, audio files, and a variety of other electronic data, or any combination thereof.

Whether included in user device 102 or located remotely from user device 102, database 212 may include computing components (e.g., database management system, database server, etc.) configured to receive and process requests for data stored in memory devices of database 212 and to provide data from database 212.

In some embodiments, database 212 may be implemented using a single computer-readable storage medium. In other embodiments, database 212 may be maintained in a network attached storage device, in a storage area network, or combinations thereof, etc. Furthermore, database 212 may be maintained and queried using numerous types of database software and programming languages, for example, SQL, MySQL, IBM DB2®, Microsoft Access®, PERL, C/C++, Java®, etc.

Figure 3:
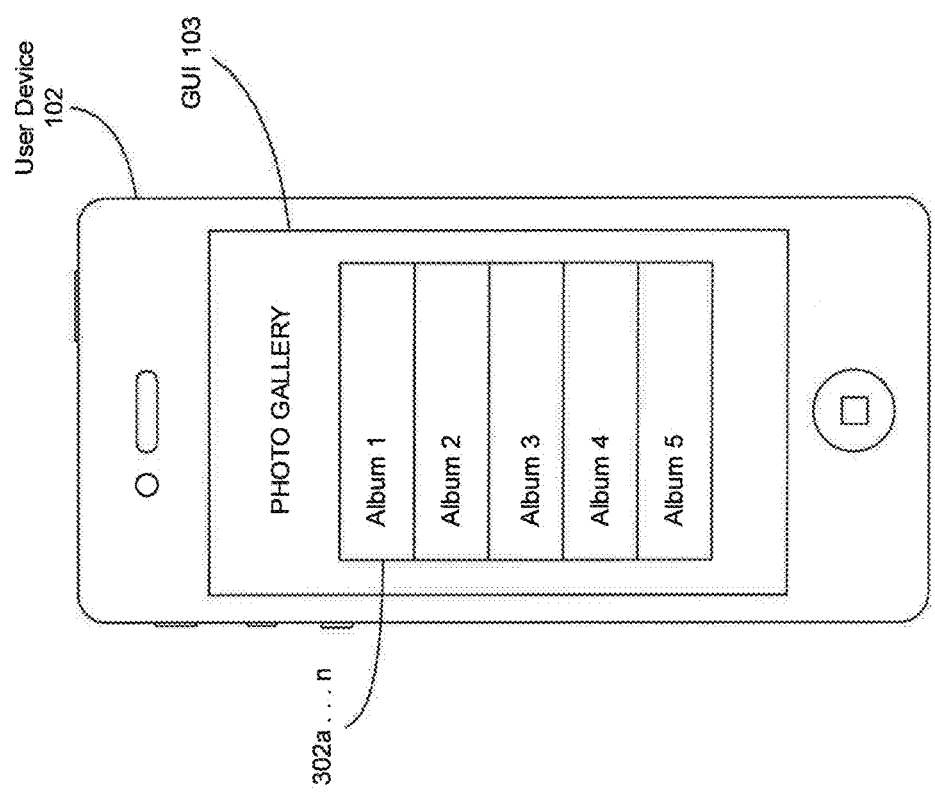
FIG. 3 shows an exemplary user device used to authenticate a user, in accordance with embodiments of the present disclosure.

FIG. 3 depicts an exemplary embodiment of user device 102 configured for authenticating a user. In particular, FIG. 3 shows an exemplary embodiment of GUI 103 on user device 102 for displaying a plurality of previously captured images of the user that may be stored in various photo albums 302a . . . n in the user device 102. For illustrative purposes, albums 302a . . . n are depicted as Album 1 . . . Album 5. GUI 103 may display the names of each photo album 302a . . . n stored in the user device 102 in a grid format. The user may select each of photo albums 302a . . . n in order to access all of the images or videos stored in each of albums 302a . . . n. Photo albums 302a . . . n may be displayed in chronological order of when the user captured the most recent image or when the user recorded the most recent video. In this example, the most recent image captured or video recorded was stored in Album 1.

As will be discussed more in detail below, one or more processor(s) 201 of user device 102 may access a plurality of images previously captured and stored in albums 302a . . . n. One or more processor(s) 201 may be configured to process, analyze, and evaluate the images stored in user device 102 in order to authenticate the user. For example, one or more processor(s) 201 may apply a facial recognition algorithm to the images stored in user device 102 and match a newly acquired image of the user with the images stored in user device 102 to determine whether the user is authorized or not.

Figure 4:
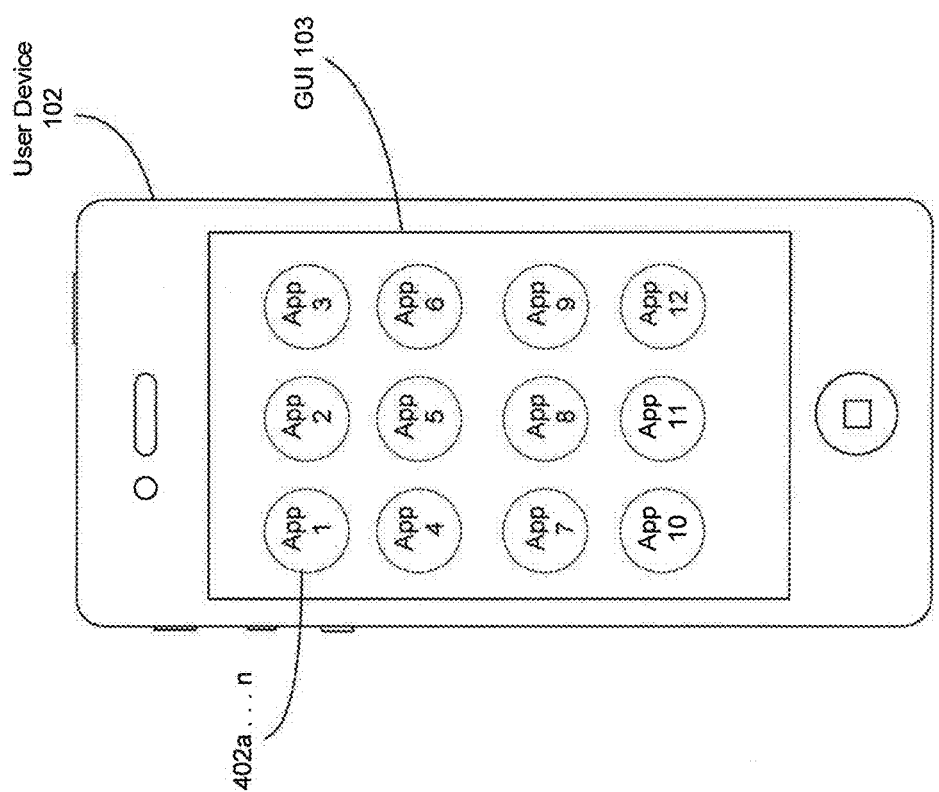
FIG. 4 shows another exemplary user device used to authenticate a user, in accordance with embodiments of the present disclosure.

FIG. 4 shows another exemplary embodiment of user device 102 configured for authenticating a user. In particular, FIG. 4 shows another exemplary embodiment of GUI 103 displayed on user device 102. GUI 103 in FIG. 4 may display one or more social networking application icons 402a . . . n. The user may be able to link and access data stored in the user's social networking profile(s) on user device 102. For example, one or more processor(s) 201 in user device 102 may link to the user's social networking profile(s) at one or more social networking site(s) 104 using one or more APIs, such as social API 105. As such, the user may be able to access the user's social networking profile(s) by touching social networking application icons 402a . . . n. Once the user links the social networking profile(s) in user device 102, one or more processor(s) 201 may be able to access and retrieve data from the social networking profile(s). As discussed above, the social networking profile(s) at one or more social networking site(s) 104 of the user may house social media profiles holding social media data for one or more account holders, such as, for example, user name, user phone number, user address, user email address, user occupation, user location information, user photos or images, images or photos in which the user is tagged, and/or other information. The social networking profile of the user may be associated with one or more social networking profiles of other users ("non-users"). For example, social networking site 104 may allow the user to accept or deny requests from other non-users to be connected on social networking site 104. Once the user accepts the request from other non-users, the social networking profiles of other non-users may be associated with the social networking profile of the user. As such, other social networking profiles of other non-users associated with the user may be displayed on the social networking profile of the user. Once one or more social networking profiles are associated or connected in social networking site 104, the user and other non-users may be able to share and access information, such as images, videos, messages, recommendations, or the like, using their social networking profiles.

Figure 5:
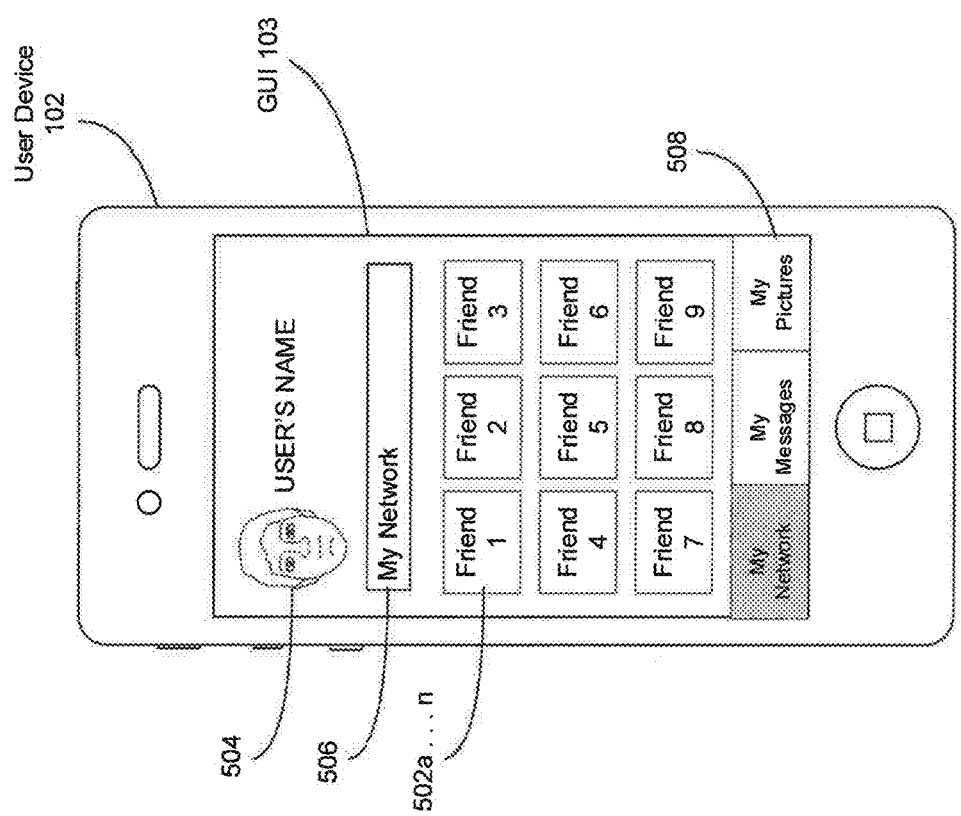
FIG. 5 shows another exemplary user device used to authenticate a user, in accordance with embodiments of the present disclosure.

FIG. 5 shows another exemplary embodiment of user device 102 configured for authenticating a user. In particular, FIG. 5 shows another exemplary embodiment of GUI 103 displayed on user device 102. As discussed above, the user may be able to link the user's social networking profile(s) to user device 102 and be able to access the user's social networking profile(s) by touching social networking application icons 402a . . . n in FIG. 4. Once the user accesses the user's social networking profile on user device 102 (i.e. by providing username, password, and/or other credentials associated with the user's social networking profile), GUI 103 may display data associated with the user's social networking profile. By way of example, GUI 103 may display the user's picture 504, the user's name, and various activatable icons 508. While activatable icons 508 are displayed as buttons in FIG. 5, icons 508 may comprise other GUI elements, for example, windows, menus, drop-down lists, controls, text boxes, scroll bars, sliders, or any other GUI elements well-known in the art. The user associated with the device may activate, manipulate, select, or provide input by clicking, tapping, manipulating, and/or entering data in one or more GUI elements of GUI 103 using one or more I/O devices 202. In this example, GUI 103 may display activatable icons 508 for accessing the user's network (i.e. connections, friends, etc.), user's messages, and user's pictures. For example, if the user activates one of the icons 508 to access the user's pictures, then GUI 103 may display all of the images stored in the user's social networking profile. The images stored in the user's social networking profile may be images of the user, images of the user's connections ("non-users"), and/or any combination thereof. GUI 103 may also display activatable icons 508 for accessing the user's videos, privacy settings, account settings, and/or other data associated with the user's social networking profile.

According to FIG. 5, the user may select to view the user's network. As such, GUI 103 may display a title 506 of icon 508 selected by the user. GUI 103 may further display a list of social networking profiles of non-users 502*a* . . . *n* that are associated with the social networking profile of the user. The social networking profiles of non-users 502*a* . . . *n* may be activatable by the user. That is, the user may be able to activate, manipulate, or select one or more of the social networking profiles of non-users 502*a* . . . *n* by clicking, tapping, manipulating, and/or entering data in one or more GUI elements of GUI 103 using one or more I/O devices 202. The social networking profiles of non-users 502*a* . . . *n* may be associated with the social networking profile of the user by consent. That is, non-users may not be able to automatically associate their social networking profiles with the social networking profile of the user. Rather, non-users must send a request to associate their social networking profiles with the social networking profile of the user. Once the request is accepted by the user, the social networking profiles of non-users may be associated with the social networking profile of the user. Alternatively, the user may send a request to another non-user in order to associate the user's social networking profile with social networking profiles of non-users. Once social networking profiles are associated, data from the social networking profiles may be shared with one another via the social API 105. In FIG. 5, the user's social networking profile is associated with social networking profiles of non-users 502*a* . . . *n* in the user's network. As such, the user may be able to access data from each of the social networking profiles of non-users 502*a* . . . *n*. For example, the user may be able to access images and videos stored in each of the social networking profiles of non-users 502*a* . . . *n*. That is, one or more processor(s) 201 of user device 102 may be able to access images and videos stored in each of the social networking profiles of non-users 502*a* . . . *n* associated with each of the user's social networking profiles. If the user has multiple social networking profiles at multiple social networking sites 104, one or more processor(s) 201 of user device 102 may be able to access images and videos stored in each of the social networking profiles of non-users associated with each of the multiple social networking profiles. One or more proces- sor(s) 201 may also store the images and videos in database 212.

By way of example, social API 105 may provide encryption and filtering functionality to prevent, for example, identity theft and fraudulent transactions. For example, social API 105 may filter out personally identifying information that is unnecessary, such as, social security numbers. Social API 105 may also encrypt, for example, account and routing numbers to ensure that any account identifying data is secure during transmission and storage.

Figure 6:
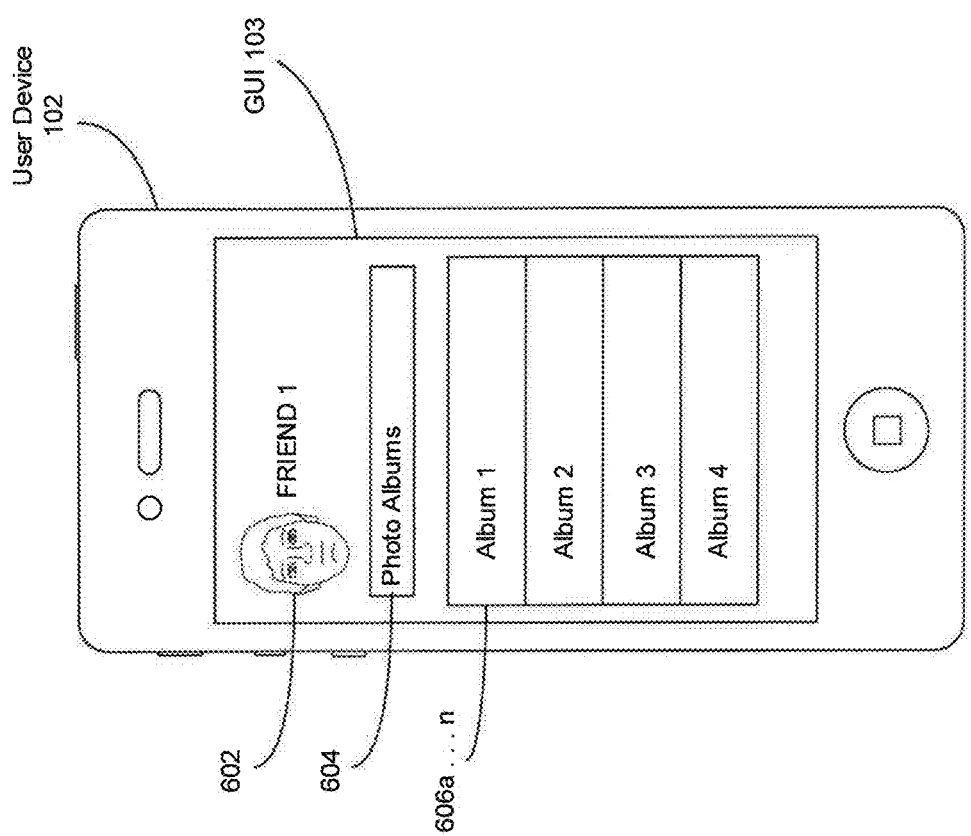
FIG. 6 shows another exemplary user device used to authenticate a user, in accordance with embodiments of the present disclosure.

FIG. 6 shows another exemplary embodiment of user device 102 configured for authenticating a user. In particular, FIG. 6 shows another exemplary embodiment of GUI 103 displayed on user device 102. As discussed above, the user may activate, manipulate, or select the social networking profile of "Friend 1" by clicking, tapping, manipulating, and/or entering data in one or more GUI elements of GUI 103 using one or more I/O devices 202. As such, once the user activates, manipulates, or selects the social networking profile of "Friend 1," the user may be able to access data associated with the social networking profile of "Friend 1."

According to FIG. 6, the user may access images stored in the social networking profile of "Friend 1." As such, GUI 103 may display a title 604 of the type of data accessed by the user. GUI 103 may further display image 602 of "Friend 1" associated with the social networking profile. GUI 103 may also display the name of "Friend 1." If, for example, the user requests to access images stored in the social networking profile of "Friend 1," GUI 103 may display a plurality of previously captured images stored in various photo albums 606*a* . . . *n* in the social networking profile of "Friend 1." GUI 103 may display the names of each photo album 606*a* . . . *n* stored in the social networking profile of "Friend 1" in a grid format as, for example, Album 1 . . . Album 4. The user may select each of the photo albums 606*a* . . . *n* in order to access all of the images or videos stored in each of the albums 606*a* . . . *n*. The photo albums 606*a* . . . *n* may be displayed in chronological order of when "Friend 1" captured the most recent image or when "Friend 1" recorded the most recent video. In this example, the most recent image captured or video recorded was stored in Album 1. Images stored in the social networking profile of "Friend 1", by way of example, may include images of "Friend 1" (non-user), images of the user, and/or any combination thereof.

As will be discussed below, one or more processor(s) 201 of the user device 102 may access a plurality of images previously captured and stored in the albums 606*a* . . . *n*. One or more processor(s) 201 may be configured to process, analyze, and evaluate the images stored in social networking profiles of non-users associated with the social networking profile of the user in order to authenticate the user. For example, one or more processor(s) 201 may apply a facial recognition algorithm to the images stored in social networking profiles of non-users to determine whether the user is authorized or not. For example, one or more processor(s) 201 may apply a facial recognition algorithm to images stored in albums 606*a* . . . *n* in order to determine whether the user is an authorized user.

Figure 7:
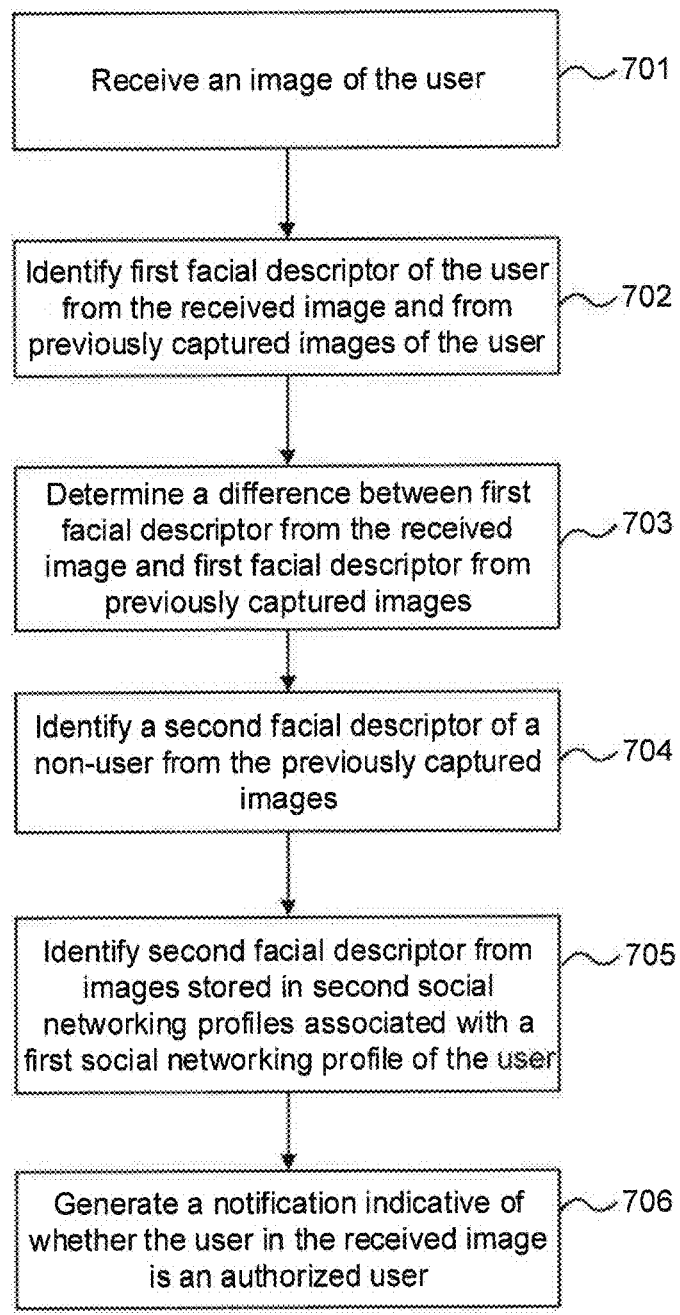
FIG. 7 shows an exemplary process of authenticating a user, in accordance with embodiments of the present disclosure.

FIG. 7 is a flow chart illustrating an exemplary method 700 for authenticating a user. Method 700 shown in FIG. 7 can be executed or otherwise performed by one or more combinations of various systems. Method 700 as described below may be carried out by the system for authenticating a user, as shown in FIG. 1, by way of example, and various elements of that system are referenced in explaining method 700. Each block shown in FIG. 7 represents one or more processes, methods, or subroutines in exemplary method 700. Referring to FIG. 7, exemplary method 700 begins at block 701.

At block 701, one or more processor(s) 201 of user device 102 receive an image of the user. The image of the user may be received in response to a request for user authentication received by one or more processor(s) 201. For example, one or more processor(s) 201 may receive a request for user authentication when the user is attempting to unlock user device 102 to access data stored in user device 102, when the user is making a purchase transaction with merchant 107, when the user is accessing social networking site 104, when the user is making a payment with financial institution 109, and/or any combination thereof. Once one or more processor(s) 201 receive a request for user authentication, one or more processor(s) 201 may prompt the user to capture an image of the user or, alternatively, record a video of the user. In response to prompting the user to capture an image of the user or record a video of the user, one or more processor(s) 201 may activate one or more sensor(s) 203 such that the user may capture an image or record a video using sensor(s)

203. Additionally or alternatively, one or more processor(s) 201 may prompt the user to input user credential associated with user device 102 or stored in memory 204 and/or storage medium 206 of user device 102 via one or more I/O devices 202.

At block 701, one or more processor(s) 201 prompt the user to capture the image of the user, and thus, receive the image of the user. Once one or more processor(s) 201 receive the image of the user, method 700 proceeds to block 702. At block 702, one or more processor(s) 201 may identify a first facial descriptor of the user from the received image and identify the first facial descriptor of the user from one or more previously captured images of the user stored in memory 204, storage medium 206, and/or database 212 of user device 102. The first facial descriptor of the user may comprise one or more facial components of the user, such as a nose of the user, eye(s) of the user, a mouth of the user, eyebrow(s) of the user, a chin of the user, overall shape of the user's face, orientation of the user's face, distribution of facial structures, and/or any combination thereof. In order to identify the first facial descriptor of the user, one or more processor(s) 201 may apply a facial recognition algorithm to the received image and/or previously captured images of the user stored in user device 102. By way of example, one or more processor(s) 201 may be configured to apply a facial recognition algorithm that analyzes variation in the images, such as pixel variations, color variations, orientation variations, etc. In one exemplary embodiment, a color histogram of the user's face in the received image may be generated in addition to color histograms of the user's faces in previously captured images stored in user device 102. Based on the color histogram, one or more processor(s) 201 may be configured to determine facial descriptors of the user. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the first facial descriptor of the user.

Once the first facial descriptor of the user is identified in the received image and in the previously captured images stored in user device 102, method 700 proceeds to block 703. At block 703, one or more processor(s) 201 may determine a difference between the first facial descriptor identified in the received image and the first facial descriptor identified in the previously captured images stored in user device 102. For example, one or more processor(s) 201 may determine a difference between the first facial descriptor identified in the received image and the first facial descriptor identified in the images stored in albums 302a . . . n of user device 102.

In order to determine a difference between the first facial descriptor from the received image and that from the previously captured images stored in user device 102, one or more processor(s) 201 may generate color histograms of the images. By way of example, one or more processor(s) 201 may generate a color histogram of the received image to identify the first facial descriptor. One or more processor(s) 201 may further generate color histograms of the previously captured images stored in user device 102. Then, one or more processor(s) 201 compare the color histogram of the received image to the color histograms of the previously captured images in order to match the color histogram of the received image to the color histograms of the previously captured images. Based on the comparison of the color histograms, one or more processor(s) 201 determine a difference between the first facial descriptor from the received image and the first facial descriptor from the previously captured images stored in user device 102. For example, one or more processor(s) 201 may calculate a ratio or percentage of first facial descriptors from previously captured images stored in user device 102 that did not match with the first facial descriptor from the received image. If the ratio or percentage calculated is lower than a predetermined threshold, one or more processor(s) 201 determine that the received image matches the previously captured images of the user stored in user device 102. The predetermined threshold may vary based on the level of security required, riskiness of authentication, riskiness of transaction, or the like. For example, if the user is requesting authentication to make a financial transaction with financial institution 109 (e.g., paying a credit card balance), the level of security and/or riskiness of the transaction will be higher than if the user is requesting authentication to unlock a device. Therefore, the predetermined threshold may be varied such that it becomes more difficult for one or more processor(s) 201 to authenticate the user.

Additionally or alternatively, one or more processor(s) 201 may align the received image with the previously captured images of the user stored in user device 102 in order to determine a difference between the first facial descriptor from the received image and the first facial descriptor from the previously captured images of the user. More particularly, one or more processor(s) 201 may proceed to align the first facial descriptor from the received image with the first facial descriptor identified in previously captured images of the user. For example, orientation of the images may be adjusted in order to align the first facial descriptor from the received image with the first facial descriptor identified in previously captured images of the user. One or more processor(s) 201 may assign a numerical value based on the alignment. For example, one or more processor(s) 201 may assign a value of 5 (on a scale of 0 to 100) if the first facial descriptor from the received image aligns very closely with the first facial descriptor identified in previously captured images of the user. Alternatively, one or more processor(s) 201 may assign a value of 90 if the first facial descriptor from the received image does not align closely with the first facial descriptor identified in previously captured images of the user. If the value assigned is lower than a predetermined threshold (meaning the difference between the received image and the previously captured images is below the predetermined threshold), one or more processor(s) 201 determine that the user is an authorized user based on the alignment.

Method 700 further proceeds to block 704, at which one or more processor(s) 201 identify a second facial descriptor of a non-user from the previously captured images. For example, one or more processor(s) 201 may apply a facial recognition algorithm to identify a second facial descriptor of people in the images other than the user ("non-users"). As discussed above, the second facial descriptor of non-users may comprise one or more facial components of non-users, such as nose, eye(s), mouth(s), eyebrow(s), chin, overall shape of the face, orientation of the face, distribution of facial structures, and/or any combination thereof. In order to identify the second facial descriptor of one or more non-users, one or more processor(s) 201 may apply a facial recognition algorithm to the previously captured images stored in user device 102. By way of example, one or more processor(s) 201 may be configured to apply a facial recognition algorithm that analyzes variation in the images, such as pixel variations, color variations, orientation variations, etc. In one exemplary embodiment, a color histogram of non-users' faces in the received image may be generated in addition to color histograms of non-users' faces in previously captured images stored in user device 102. Based on the color histograms generated, one or more processor(s) 201 may be configured to determine second facial descriptors of non-users in the previously captured images stored in user device 102. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the second facial descriptors of non-users.

Once second facial descriptors of non-users other than the user are determined, method 700 proceeds to block 705. At block 705, one or more processor(s) 201 may identify the second facial descriptors from images stored in social networking profiles of non-users 502*a* . . . *n* (in FIG. 5) associated with the social networking profile(s) of the user. Similarly, one or more processor(s) 201 may apply a facial recognition algorithm to some or all of images in albums 606*a* . . . *n* stored in social networking profiles of non-users 502*a* . . . *n* associated with the social networking profile(s) of the user. By way of example, one or more processor(s) 201 may be configured to apply a facial recognition algorithm that analyzes variation in the images, such as pixel variations, color variations, orientation variations, etc. In one exemplary embodiment, a color histogram of non-users' faces in images in albums 606*a* . . . *n* may be generated. Based on the color histograms generated, one or more processor(s) 201 may be configured to determine second facial descriptors of non-users in images in albums 606*a* . . . *n*. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the second facial descriptors of non-users in the images in albums 606*a* . . . *n*.

One or more processor(s) 201 may determine a difference between the second facial descriptor of non-users identified in the previously captured images in albums 302*a* . . . *n* stored in the user device to the second facial descriptors of non-users identified in images in albums 606*a* . . . *n* stored in social networking profiles of non-users 502*a* . . . *n* associated with the social networking profile of the user. For example, one or more processor(s) 201 may determine a difference between the first facial descriptor identified in the received image and the first facial descriptor identified in the images stored in albums 302*a* . . . *n* of user device 102.

In order to determine a difference between the second facial descriptor from the previously captured images in albums 302*a* . . . *n* and that from images in albums 606*a* . . . *n* stored in social networking profiles of non-users 502*a* . . . *n*, one or more processor(s) 201 may generate color histograms of the images. By way of example, one or more processor(s) 201 may generate color histograms of previously captured images in albums 302*a* . . . *n* to identify the second facial descriptor of non-users other than the user. One or more processor(s) 201 may further generate color histograms of images in albums 606*a* . . . *n* stored in social networking profiles of non-users 502*a* . . . *n* associated with the social networking profile of the user. Then, one or more processor(s) 201 may compare the color histograms in order to match the color histograms of the previously captured images of non-users 502*a* . . . *n* to the color histograms of the images in albums 606*a* . . . *n* stored in social networking profiles of non-users 502*a* . . . *n* associated with the social networking profile of the user. Based on the comparison of the color histograms, one or more processor(s) 201 may determine a difference between the second facial descriptor from the previously captured images and the second facial descriptor from the images stored in social networking profiles of non-users associated with the social networking profile of the user. For example, one or more processor(s) 201 may be able to calculate a ratio or percentage of second facial descriptors from previously captured images stored in user device 102 that did not match with the second facial descriptor from the images stored in social networking profiles of non-users associated with the social networking profile of the user. While generating color histograms is discussed, the second facial descriptor may be identified by use of other facial recognition algorithms, such as by aligning the images as discussed above.

As such, one or more processor(s) 201 may be able to compare images of the user's friends, connections, etc. in the user's previously captured image stored in user device 102 to images of the user's friends, connections, etc. in their social networking profiles associated with the social networking profile of the user. By doing so, one or more processor(s) 201 can provide a second level of security for user authentication. For example, a cloned social networking profile may not have the same friends, connections, etc. as the original social networking profile of the user. By comparing images of user's friends and/or connections stored in user device 102 to the images stored in the user's friends' and connections' social networking profiles, one or more processor(s) 201 can evaluate whether the user is indeed an authorized user.

Once the first facial descriptor and the second facial descriptor are identified, method 700 proceeds to block 706. At block 706, one or more processor(s) 201 generate a notification indicative of whether the user in the received image is an authorized user. One or more processor(s) 201 may determine whether the user is an authorized user based on the first facial descriptor identified in the received image, the first facial descriptor identified in the previously captured images, the second facial descriptor identified in the previously captured images, the second facial descriptor identified in images stored in one or more social networking profiles of non-users associated with the social networking profile of the user, the difference between the first facial descriptor from the received image and the first facial descriptor from the previously captured image, and/or the difference between the second facial descriptor from previously captured images and the second facial descriptor from images stored in one or more social networking profiles of non-users associated with the social networking profile of the user. For example, a notification that the user is an authorized user may be generated when the difference between the first facial descriptor from the previously captured images and the first facial descriptor from the received image is lower than a predetermined threshold. Additionally or alternatively, the difference between the first facial descriptor from the received image and the first facial descriptor from the previously captured images is weighted higher than the identified second facial descriptor to determine whether the user is an authorized user.

Generating the notification that the user is an authorized user may comprise enabling the user to perform a financial transaction with financial institution 109, unlocking user device 102, enabling the user to access contents stored in user device 102, enabling the user to perform a purchase transaction with merchant 107, accessing one or more social networking site(s) 104, or any combination thereof. Additionally or alternatively, the notification generated may be a visual notification that is prompted to the user via GUI 103 of the user device 102 or an audible notification.

Figure 8:
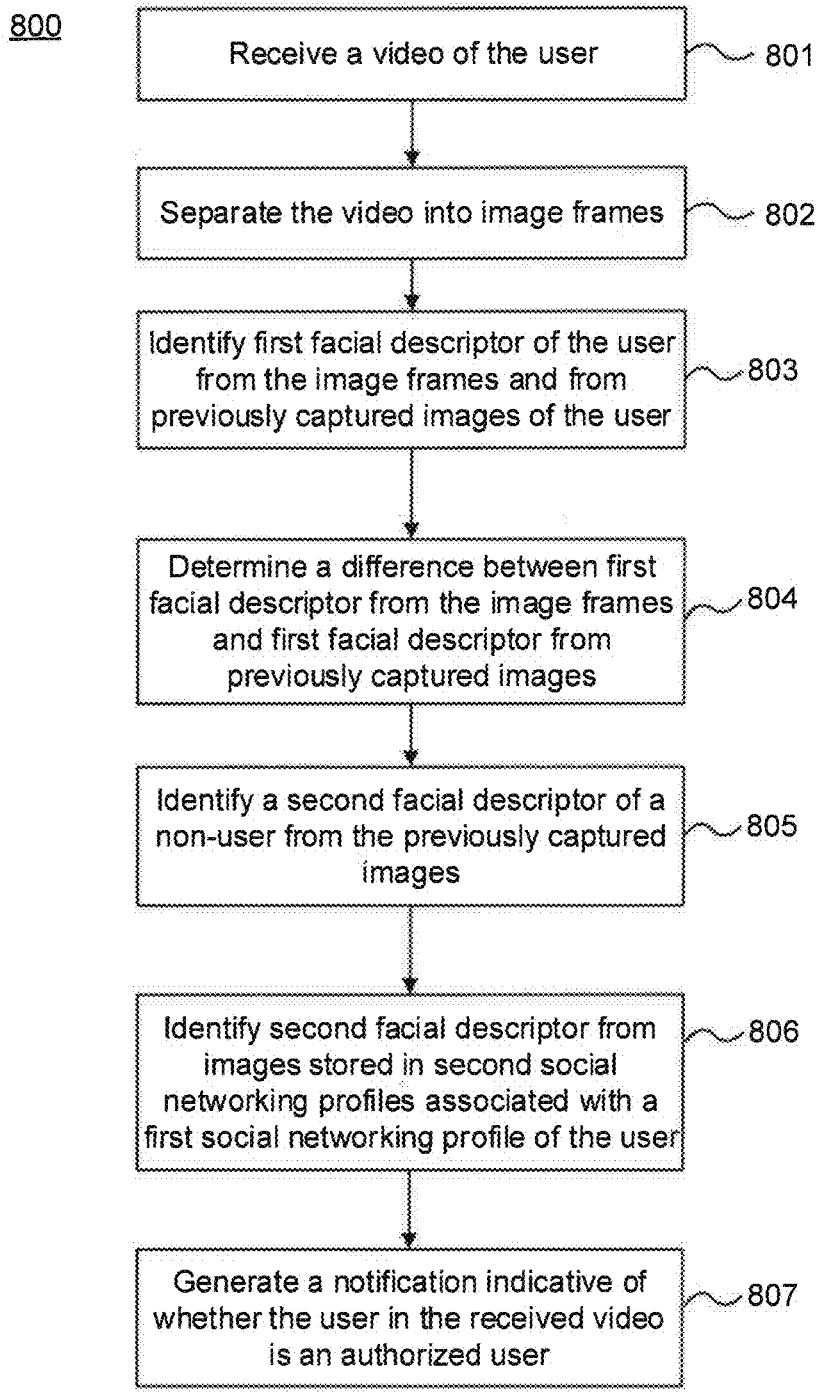
FIG. 8 shows another exemplary process of authenticating a user, in accordance with embodiments of the present disclosure.

FIG. 8 is a flow chart illustrating another exemplary method 800 for authenticating a user. Method 800 shown in FIG. 8 can be executed or otherwise performed by one or more combinations of various systems. Method 800 as described below may be carried out by the system for authenticating a user, as shown in FIG. 1, by way of example, and various elements of that system are referenced in explaining method 800. Each block shown in FIG. 8 represents one or more processes, methods, or subroutines in the exemplary method 800. Referring to FIG. 8, exemplary method 800 begins at block 801.

At block 801, one or more processor(s) 201 of user device 102 receive a video of the user. The video of the user may be received in response to a request for user authentication received by one or more processor(s) 201. For example, one or more processor(s) 201 may receive a request for user authentication when the user is attempting to unlock user device 102 to access data stored in user device 102, when the user is accessing social networking site 104, when the user is making a purchase transaction with merchant 107, when the user is making a payment with financial institution 109, and/or any combination thereof. Once one or more processor(s) 201 receive a request for user authentication, one or more processor(s) 201 prompt the user to record a video. In response to prompting the user to record a video of the user, one or more processor(s) 201 may activate one or more sensor(s) 203 such that the user can record a video using sensor(s) 203. Additionally or alternatively, one or more processor(s) 201 may prompt the user to input user credential associated with user device 102 or stored in memory 204 and/or storage medium 206 of the user device 102 via one or more I/O devices 202.

Once one or more processor(s) 201 received a video of the user, method 800 proceeds to block 802. At block 802, one or more processor(s) 201 separate the video into one or more image frames. For example, one or more processor(s) 201 may be configured to process the recorded video of the user in order to separate the video into a plurality of frames of images captured. As such, one or more processor(s) 201 may be configured to analyze each of the plurality of frames separately to observe any changes of facial descriptor(s) of interest. In some embodiments, one or more processor(s) 201 may be configured to selectively choose a predetermined number of frames to be analyzed instead of analyzing each of the frames, in order to increase efficiency. The number of frames selectively chosen for analysis may be based on various parameters, including, for example, level of security required, riskiness of transaction, riskiness of authentication, and/or the like.

Once the received video is separated into one or more image frames, method 800 proceeds to block 803. At block 803, one or more processor(s) 201 identify a first facial descriptor of the user from the image frames and identify the first facial descriptor of the user from one or more previously captured images of the user stored in memory 204, storage medium 206, and/or database 212 of user device 102. The first facial descriptor of the user may comprise one or more facial components of the user, such as a nose of the user, eye(s) of the user, a mouth of the user, eyebrow(s) of the user, a chin of the user, overall shape of the user's face, orientation of the user's face, distribution of facial structures, and/or any combination thereof. In order to identify the first facial descriptor of the user, one or more processor(s) 201 may apply a facial recognition algorithm to the image frames and/or previously captured images of the user stored in user device 102. By way of example, one or more processor(s) 201 may be configured to apply a facial recognition algorithm that analyzes variation in the images, such as pixel variations, color variations, orientation variations, etc. In one exemplary embodiment, a color histogram of the user's face in the image frames may be generated in addition to color histograms of the user's faces in previously captured images stored in user device 102. Based on the color histogram, one or more processor(s) 201 may be configured to determine facial descriptors of the user. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the first facial descriptor of the user.

Once the first facial descriptor of the user is identified in the image frames and in the previously captured images stored in user device 102, method 800 proceeds to block 804. At block 804, one or more processor(s) 201 determine a difference between the first facial descriptor identified in the image frames and the first facial descriptor identified in the previously captured images stored in user device 102. For example, one or more processor(s) 201 may determine a difference between the first facial descriptor identified in the image frames and the first facial descriptor identified in the images stored in albums 302a . . . n of user device 102.

In order to determine a difference between the first facial descriptor from the image frames and that from the previously captured images stored in the user device 102, one or more processor(s) 201 may generate color histograms of the images. By way of example, one or more processor(s) 201 may generate color histograms of the image frames to identify the first facial descriptor. One or more processor(s) 201 may further generate color histograms of the previously captured images stored in user device 102. Then, one or more processor(s) 201 may compare color histograms of the image frames to the color histograms of the previously captured images in order to match color histograms of the image frames to the color histograms of the previously captured images. Based on the comparison of the color histograms, one or more processor(s) 201 may determine a difference between the first facial descriptor from the image frames and the first facial descriptor from the previously captured images stored in user device 102. For example, one or more processor(s) 201 may be able to calculate a ratio or percentage of first facial descriptors from previously captured images stored in user device 102 that did not match with the first facial descriptor from the image frames. If the ratio or percentage calculated is lower than a predetermined threshold, one or more processor(s) 201 may determine that the image frames from the received video match the previously captured images of the user stored in user device 102. The predetermined threshold may vary based on the level of security required, riskiness of authentication, riskiness of transaction, or the like. For example, if the user is requesting authentication to make a financial transaction with financial institution 109 (e.g., paying a credit card balance), the level of security and/or riskiness of the transaction will be higher than if the user is requesting authentication to unlock a device. Therefore, the predetermined threshold may be varied such that it becomes more difficult for one or more processor(s) 201 to authenticate the user.

Additionally or alternatively, one or more processor(s) 201 may align the image frames from the received video with the previously captured images of the user stored in user device 102 in order to determine a difference between the first facial descriptor from the image frames and the first facial descriptor from the previously captured images of the user. By way of example, one or more processor(s) 201 may apply a facial recognition algorithm to the image frames and identify the first facial descriptor of the user. Then, one or more processor(s) 201 may apply the facial recognition algorithm to previously captured images of the user stored in user device 102 to identify the first facial descriptor of the user from the previously captured images. One or more processor(s) 201 may proceed to align the first facial descriptor from the image frames with the first facial descriptor identified in previously captured images of the user. For example, orientation of the images may be adjusted in order to align the first facial descriptor from the image frames with the first facial descriptor identified in previously captured images of the user. One or more processor(s) 201 may then assign a numerical value based on the alignment. For example, one or more processor(s) 201 may assign a value of 5 (on a scale of 0 to 100) if the first facial descriptor from the image frames aligns very closely with the first facial descriptor identified in previously captured images of the user. Alternatively, one or more processor(s) 201 may assign a value of 90 if the first facial descriptor from the image frames does not align closely with the first facial descriptor identified in previously captured images of the user. If the value assigned is lower than a predetermined threshold (meaning the difference between the image frames and the previously captured images is below a predetermined threshold), one or more processor(s) 201 determine that the user is an authorized user based on the alignment.

Method 800 further proceeds to block 805, at which one or more processor(s) 201 identify a second facial descriptor of a non-user from the previously captured images. For example, one or more processor(s) 201 may apply a facial recognition algorithm to identify a second facial descriptor of people in the image other than the user ("non-users"). As discussed above, the second facial descriptor of non-users may comprise one or more facial components of non-users, such as nose, eye(s), mouth(s), eyebrow(s), chin, overall shape of the face, orientation of the face, distribution of facial structures, and/or any combination thereof. In order to identify the second facial descriptor of one or more non-users, one or more processor(s) 201 may apply a facial recognition algorithm to the previously captured images stored in user device 102. By way of example, one or more processor(s) 201 may be configured to apply a facial recognition algorithm that analyzes variation in the images, such as pixel variations, color variations, orientation variations, etc. In one exemplary embodiment, a color histogram of non-users' faces in the received image may be generated in addition to color histograms of non-users' faces in previously captured images stored in user device 102. Based on the color histograms generated, one or more processor(s) 201 may be configured to determine second facial descriptors of non-users in the previously captured images stored in user device 102. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the second facial descriptors of non-users.

Once second facial descriptors of non-users other than the user are determined, method 800 proceeds to block 806. At block 806, one or more processor(s) 201 identify the second facial descriptors from images stored in social networking profiles of non-users 502a . . . *n* (in FIG. 5) associated with the social networking profile(s) of the user. Similarly, one or more processor(s) 201 may apply a facial recognition algorithm to some or all of the images in albums 606a . . . *n* stored in social networking profiles of non-users 502a . . . *n* associated with the social networking profile(s) of the user. By way of example, one or more processor(s) 201 may be configured to apply a facial recognition algorithm that analyzes variation in the images, such as pixel variations, color variations, orientation variations, etc. In one exemplary embodiment, a color histogram of non-users' faces in the images in albums 606a . . . *n* may be generated. Based on the color histograms generated, one or more processor(s) 201 may be configured to determine second facial descriptors of non-users in the images in albums 606a . . . *n*. In another embodiment, one or more processor(s) 201 may be configured to apply a facial recognition algorithm that uses machine-learning algorithms, such as decision tree learning, deep learning, rule-based machine learning, Bayesian networks, etc. In one embodiment, one or more processor(s) 201 may be configured to apply deep learning algorithms to provide computer vision, process and analyze the images, and identify the second facial descriptors of non-users in the images in albums 606a . . . *n*.

One or more processor(s) 201 may determine a difference between the second facial descriptor of non-users identified in the previously captured images in albums 302a . . . *n* stored in the user device to the second facial descriptors of non-users identified in the images in albums 606a . . . *n* stored in social networking profiles of non-users 502a . . . *n* associated with the social networking profile of the user. For example, one or more processor(s) 201 may determine a difference between the first facial descriptor identified in the received image and the first facial descriptor identified in the images stored in albums 302a . . . *n* of user device 102.

In order to determine a difference between the second facial descriptor from the previously captured images in albums 302a . . . *n* and that from images in albums 606a . . . *n* stored in social networking profiles of non-users 502a . . . *n*, one or more processor(s) 201 may generate color histograms of the images. By way of example, one or more processor(s) 201 may generate color histograms of previously captured images in albums 302a . . . *n* to identify the second facial descriptor of non-users other than the user. One or more processor(s) 201 may further generate color histograms of images in albums 606a . . . *n* stored in social networking profiles of non-users 502a . . . *n* associated with the social networking profile of the user. Then, one or more processor(s) 201 may compare the color histograms in order to match the color histograms of the previously captured images 502a . . . *n* to the color histograms of the images in albums 606a . . . *n* stored in social networking profiles of non-users 502a . . . *n* associated with the social networking profile of the user. Based on the comparison of the color histograms, one or more processor(s) 201 may determine a difference between the second facial descriptor from the previously captured images and the second facial descriptor from the images stored in social networking profiles of non-users associated with the social networking profile of the user. For example, one or more processor(s) 201 may be able to calculate a ratio or percentage of second facial descriptors from previously captured images stored in user device 102 that did not match with the second facial descriptor from the images stored in social networking profiles of non-users associated with the social networking profile of the user. While generating color histograms is discussed, the second facial descriptor may be identified by use of other facial recognition algorithms, such as by aligning the images as discussed above.

As such, one or more processor(s) 201 may be able to compare images of the user's friends, connections, etc. in the user's previously captured image stored in user device 102 to images of the user's friends, connections, etc. in their social networking profiles associated with the social networking profile of the user. By doing so, one or more processor(s) 201 can provide a second level of security for user authentication. For example, a cloned social networking profile may not have the same friends, connections, etc. as the original social networking profile of the user. By comparing images of user's friends and/or connections stored in user device 102 to the images stored in the user's friends' and connections' social networking profiles, one or more processor(s) 201 can evaluate whether the user is indeed an authorized user.

Once the first facial descriptor and the second facial descriptor are identified, method 800 proceeds to block 807. At block 807, one or more processor(s) 201 generate a notification indicative of whether the user in the received video is an authorized user. One or more processor(s) 201 may determine whether the user is an authorized user based on the first facial descriptor identified in the image frames, the first facial descriptor identified in the previously captured images, the second facial descriptor identified in the previously captured images, the second facial descriptor identified in images stored in one or more social networking profiles of non-users associated with the social networking profile of the user, the difference between the first facial descriptor from the image frames and the first facial descriptor from the previously captured image, and/or the difference between the second facial descriptor from previously captured images and the second facial descriptor from images stored in one or more social networking profiles of non-users associated with the social networking profile of the user. For example, a notification that the user is an authorized user may be generated when the difference between the first facial descriptor from the previously captured images and the first facial descriptor from the image frames of the received video is lower than a predetermined threshold. Additionally or alternatively, the difference between the first facial descriptor from the image frames of the received video and the first facial descriptor from the previously captured images is weighted higher than the identified second facial descriptor to determine whether the user is an authorized user.

Generating the notification that the user is an authorized user may comprise enabling the user to perform a financial transaction with financial institution 109, unlocking user device 102, enabling the user to access contents stored in user device 102, enabling the user to perform a purchase transaction with merchant 107, accessing one or more social networking site(s) 104, or any combination thereof. Additionally or alternatively, the notification generated may be a visual notification that is prompted to the user via GUI 103 of user device 102 or an audible notification.

Figure 9:
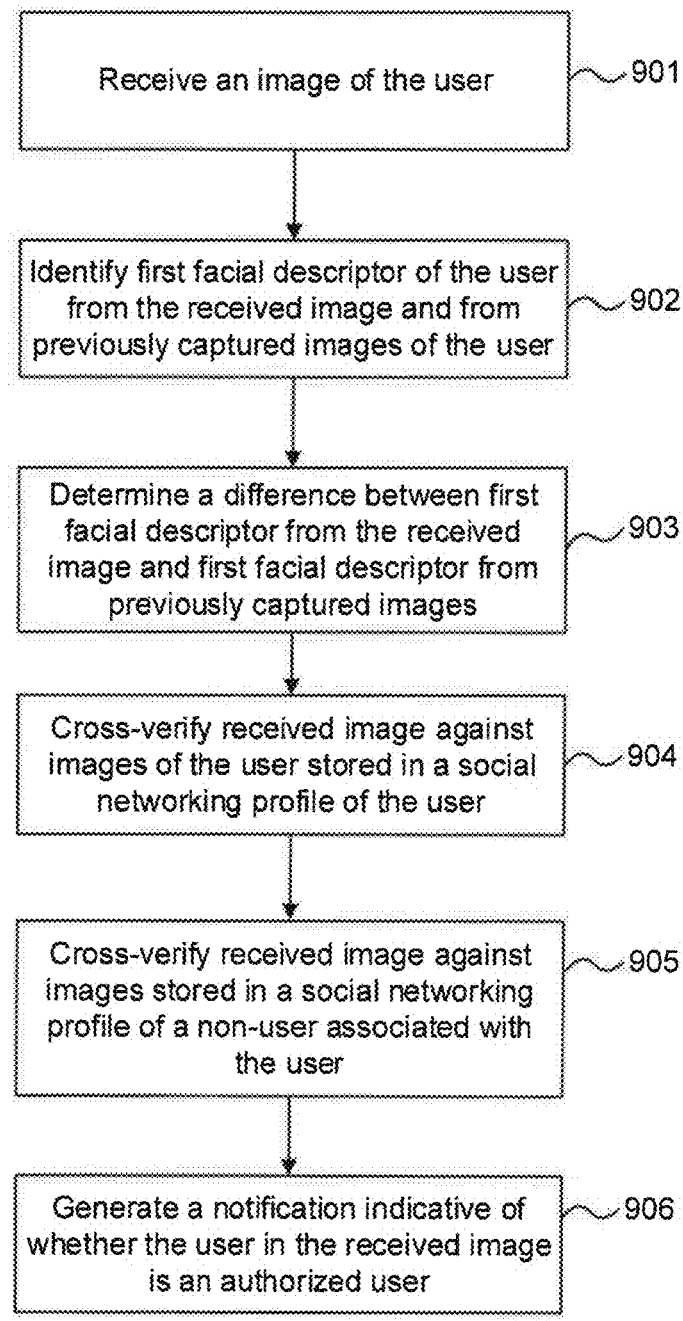
FIG. 9 shows another exemplary process of authenticating a user, in accordance with embodiments of the present disclosure.

FIG. 9 is a flow chart illustrating another exemplary method 900 for authenticating a user. Method 900 shown in FIG. 9 can be executed or otherwise performed by one or more combinations of various systems. Method 900 as described below may be carried out by the system for authenticating a user, as shown in FIG. 1, by way of example, and various elements of that system are referenced in explaining method 900. Each block shown in FIG. 9 represents one or more processes, methods, or subroutines in the exemplary method 900. Referring to FIG. 9, exemplary method 900 begins at block 901.

At block 901, one or more processor(s) 201 of user device 102 receive an image of the user. Once the image of the user is received, method 900 proceeds to block 902. At block 902, one or more processor(s) 201 identify a first facial descriptor of the user from the received image and identify the first facial descriptor of the user from one or more previously captured images of the user stored in memory 204, storage medium 206, and/or database 212 of user device 102. Once the first facial descriptor of the user is identified in the received image and in the previously captured images stored in user device 102, method 900 proceeds to block 903. At block 903, one or more processor(s) 201 determine a difference between the first facial descriptor identified in the received image and the first facial descriptor identified in the previously captured images stored in user device 102. The steps of receiving an image of user (block 901), identifying a first facial descriptor of the user from the received image and from previously captured images of the user (block 902), and determining a difference between the first facial descriptor from the received image and the first facial descriptor from previously captured images (block 903) are discussed in detail above with respect to FIG. 7.

Method 900 proceeds to block 904. At block 904, one or more processor(s) 201 cross-verify the received image of the user against images of the user stored in social networking profile(s) of the user. By way of example, one or more processor(s) 201 may apply a facial recognition algorithm to some or all of the images of the user stored in albums 302*a* . . . *n* in social networking profile(s) o the user. By doing so, one or more processor(s) 201 may identify the first facial descriptor of the user from the images of the user stored in albums 302*a* . . . *n*. As discussed above, one or more processor(s) 201 may determine a difference between the first facial descriptor identified in the received image and the first facial descriptor identified in the images of the user stored in albums 302*a* . . . *n* of the user's social networking profile(s).

In order to determine a difference between the first facial descriptor from the received image and that from the images of the user stored in social networking profile(s) of the user, one or more processor(s) 201 may generate color histograms of the images. By way of example, one or more processor(s) 201 may generate a color histogram of the received image to identify the first facial descriptor. One or more processor(s) 201 may further generate color histograms of the images of the user stored in the user's social networking profile(s). Then, one or more processor(s) 201 may compare the color histogram of the received image to the color histograms of the images of the user stored in the user's social networking profile(s) in order to match the color histogram of the received image to the color histograms of the images of the user stored in the user's social networking profile(s). Based on the comparison of the color histograms, one or more processor(s) 201 may determine a difference between the first facial descriptor from the received image and the first facial descriptor from the images of the user stored in the user's social networking profile(s). For example, one or more processor(s) 201 may calculate a ratio or percentage of first facial descriptors from images of the user stored in the user's social networking profile(s) that did not match with the first facial descriptor from the received image. If the ratio or percentage calculated is lower than a predetermined threshold, one or more processor(s) 201 may determine that the received image matches the images of the user stored in the user's social networking profile(s). The predetermined threshold may vary based on the level of security required, riskiness of authentication, riskiness of transaction, or the like. For example, if the user is requesting authentication to make a financial transaction with financial institution 109 (e.g., paying a credit card balance), the level of security and/or riskiness of the transaction will be higher than if the user is requesting authentication to unlock a device. Therefore, the predetermined threshold may be varied such that it becomes more difficult for one or more processor(s) 201 to authenticate the user.

Additionally or alternatively, one or more processor(s) 201 may align the received image with the previously captured images of the user stored in user device 102 in order to determine a difference between the first facial descriptor from the received image and the first facial descriptor from the images of the user stored in the user's social networking profile(s). By way of example, one or more processor(s) 201 may apply a facial recognition algorithm to the received image and identify the first facial descriptor of the user. Then, one or more processor(s) 201 may apply the facial recognition algorithm to images of the user stored in the user's social networking profile(s) to identify the first facial descriptor of the user from the images of the user stored in the user's social networking profile(s). One or more processor(s) 201 may proceed to align the first facial descriptor from the received image with the first facial descriptor identified in images of the user stored in the user's social networking profile(s). For example, orientation of the images may be adjusted in order to align the first facial descriptor from the received image with the first facial descriptor identified in the images of the user stored in the user's social networking profile(s). One or more processor(s) 201 may assign a numerical value based on the alignment. For example, one or more processor(s) 201 may assign a value of 5 (on a scale of 0 to 100) if the first facial descriptor from the received image aligns very closely with the first facial descriptor identified in images of the user stored in the user's social networking profile(s). Alternatively, one or more processor(s) 201 may assign a value of 90 if the first facial descriptor from the received image does not align closely with the first facial descriptor identified in the images of the user stored in the user's social networking profile(s). If the value assigned is lower than a predetermined threshold (meaning the difference between the received image and the images of the user stored in the user's social networking profile(s) is below a predetermined threshold), one or more processor(s) 201 determine that the user is an authorized user based on the alignment.

At block 905, one or more processor(s) 201 cross-verify the received image against images of the user stored in a social networking profile of non-user(s) associated with the social networking profile of the user. By way of example, one or more processor(s) 201 may apply a facial recognition algorithm to some or all of the images of non-users stored in albums 606$a$ . . . $n$ in social networking profile(s) of non-users 502$a$ . . . $n$. By doing so, one or more processor(s) 201 may identify the first facial descriptor of the user from the images stored in albums 606$a$ . . . $n$ in social networking profile(s) of non-users 502$a$ . . . $n$. As discussed above, one or more processor(s) 201 may determine a difference between the first facial descriptor identified in the received image and the first facial descriptor identified in the images stored in albums 606$a$ . . . $n$ in social networking profile(s) of non-users 502$a$ . . . $n$ associated with the social networking profile(s) of the user.

In order to determine a difference between the first facial descriptor from the received image and that from the images stored in albums 606$a$ . . . $n$ in social networking profile(s) of non-users 502$a$ . . . $n$, one or more processor(s) 201 may generate color histograms of the images. By way of example, one or more processor(s) 201 may generate a color histogram of the received image to identify the first facial descriptor. One or more processor(s) 201 may further generate color histograms of the images stored in albums 606$a$ . . . $n$ in social networking profile(s) of non-users 502$a$ . . . $n$. Then, one or more processor(s) 201 may compare the color histogram of the received image to the color histograms of the images stored in albums 606$a$ . . . $n$ in social networking profile(s) of non-users 502$a$ . . . $n$ in order to match the color histogram of the received image to the color histograms of the images stored in albums 606$a$ . . . $n$ in social networking profile(s) of non-users 502$a$ . . . $n$. Based on the comparison of the color histograms, one or more processor(s) 201 may determine a difference between the first facial descriptor from the received image and the first facial descriptor from the images stored in albums 606$a$ . . . $n$ in social networking profile(s) of non-users 502$a$ . . . $n$. For example, one or more processor(s) 201 may calculate a ratio or percentage of first facial descriptors from images stored in albums 606$a$ . . . $n$ in social networking profile(s) of non-users 502$a$ . . . $n$ that did not match with the first facial descriptor from the received image. If the ratio or percentage calculated is lower than a predetermined threshold, one or more processor(s) 201 may determine that the received image matches the images stored in albums 606$a$ . . . $n$ in social networking profile(s) of non-users 502$a$ . . . $n$. The predetermined threshold may vary based on the level of security required, riskiness of authentication, riskiness of transaction, or the like. For example, if the user is requesting authentication to make a financial transaction with financial institution 109 (e.g., paying a credit card balance), the level of security and/or riskiness of the transaction will be higher than if the user is requesting authentication to unlock a device. Therefore, the predetermined threshold may be varied such that it becomes more difficult for one or more processor(s) 201 to authenticate the user.

Additionally or alternatively, one or more processor(s) 201 may align the received image with the images stored in albums 606$a$ . . . $n$ in social networking profile(s) of non-users 502$a$ . . . $n$ in order to determine a difference between the first facial descriptor from the received image and the first facial descriptor from the images stored in albums 606$a$ . . . $n$ in social networking profile(s) of non-users 502$a$ . . . $n$. By way of example, one or more processor(s) 201 may apply a facial recognition algorithm to the received image and identify the first facial descriptor of the user. Then, one or more processor(s) 201 may apply the facial recognition algorithm to images stored in albums 606$a$ . . . $n$ in social networking profile(s) of non-users 502$a$ . . . $n$ to identify the first facial descriptor of the user from the images stored in albums 606$a$ . . . $n$ in social networking profile(s) of non-users 502$a$ . . . $n$. One or more processor(s) 201 may proceed to align the first facial descriptor from the received image with the first facial descriptor identified in images stored in albums 606a . . . *n* in social networking profile(s) of non-users 502a . . . *n*. For example, orientation of the images may be adjusted in order to align the first facial descriptor from the received image with the first facial descriptor identified in the images stored in albums 606a . . . *n* in social networking profile(s) of non-users 502a . . . *n*. One or more processor(s) 201 may assign a numerical value based on the alignment. For example, one or more processor(s) 201 may assign a value of 5 (on a scale of 0 to 100) if the first facial descriptor from the received image aligns very closely with the first facial descriptor identified in images stored in albums 606a . . . *n* in social networking profile(s) of non-users 502a . . . *n*. Alternatively, one or more processor(s) 201 may assign a value of 90 if the first facial descriptor from the received image does not align closely with the first facial descriptor identified in the images stored in albums 606a . . . *n* in social networking profile(s) of non-users 502a . . . *n*. If the value assigned is lower than a predetermined threshold (meaning the difference between the received image and the images stored in albums 606a . . . *n* in social networking profile(s) of non-users 502a . . . n is below a predetermined threshold), one or more processor(s) may determine whether the user is an authorized user based on the alignment.

At block 906, one or more processor(s) 201 generate a notification indicative of whether the user in the received image is an authorized user. The step of generating a notification indicative of whether the user in the received image is an authorized user is discussed in detail above with respect to FIGS. 7 and 8.

Figure 10:
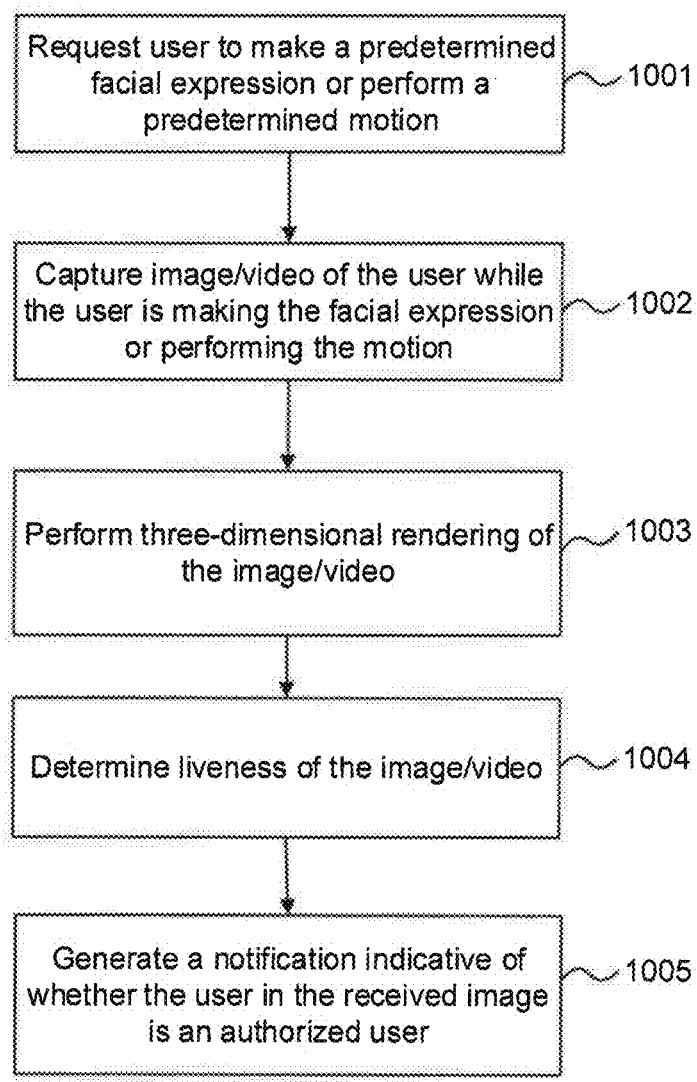
FIG. 10 shows an exemplary process of checking a liveness of the user, in accordance with embodiments of the present disclosure.

FIG. 10 is a flow chart illustrating an exemplary method 1000 for checking a liveness of the user. Method 1000 shown in FIG. 10 can be executed or otherwise performed by one or more combinations of various systems. Method 1000 as described below may be carried out by the system for authenticating a user, as shown in FIG. 1, by way of example, and various elements of that system are referenced in explaining method 1000. Each block shown in FIG. 10 represents one or more processes, methods, or subroutines in the exemplary method 1000. Referring to FIG. 10, the exemplary method 1000 begins at block 1001.

At block 1001, one or more processor(s) 201 request the user to make a predetermined facial expression. Additionally or alternatively, one or more processor(s) 201 may request the user to perform a predetermined motion. By way of example, one or more processor(s) 201 may request the user to make a predetermined facial expression, including sad face, happy face, crying face, angry face, laughing face, and/or the like. One or more processor(s) 201 may request the user to make a plurality of predetermined facial expressions. In other embodiments, one or more processor(s) 201 may request the user to perform a predetermined motion, including winking, sticking out the tongue, moving the head in one or more directions, shaking the head, and/or the like. One or more processor(s) 201 may request the user to perform a plurality of the predetermined motions.

At block 1002, one or more processor(s) 201 capture image(s) or record video(s) of the user while the user is making the facial expression or performing the motion requested. By way of example, in response to the request at block 1001 for the user to make a predetermined facial expression or perform a predetermined motion, one or more processor(s) 201 may cause one or more sensor(s) 203 to become activated. For example, after requesting the user to make a predetermined facial expression or perform a predetermined motion, one or more processor(s) 201 may activate one or more sensor(s) 203, such as a camera, such that the user can capture images of the user or record videos of the user making the facial expression or performing the motion requested. One or more processor(s) 201 may store the images captured or the videos recorded in memory 204, storage medium 206, and/or database 212 of user device 102.

Once the image(s) captured or video(s) recorded are received by one or more processor(s) 201, method 1000 proceeds to block 1003. At block 1003, one or more processor(s) 201 perform three-dimensional (3D) rendering of the image(s) or video(s). As such, one or more processor(s) 201 may be able to process and evaluate a 3D image of the user's facial descriptor. One or more processor(s) 201 may further perform 3D rendering of the previously captured images or previously recorded videos stored in user device 102. Once one or more processor(s) 201 perform 3D rendering of the received image and/or video as well as the images/videos previously stored in user device 102, one or more processor(s) 201 may compare the 3D rendered images. Additionally or alternatively, one or more processor(s) 201 may track a movement of the received 3D rendered image(s) and/or video(s). For example, one or more processor(s) 201 may identify one or more feature points on the received image or video. Afterwards, one or more proces- sor(s) 201 may track a movement of the one or more features points in space and time. By way of example, one or more processor(s) 201 may track a movement of the one or more features over multiple consecutive image frames in order to determine whether the one or more features point(s) are moving in response to the predetermined motion or predetermined facial expression requested. As such, one or more processor(s) 201 may be able to authenticate the user with high accuracy and reliability.

Once the one or more processor(s) 201 performs 3D rendering of the image(s) or video(s) of the user, method 1000 proceeds to block 1004. At block 1004, one or more processor(s) 201 detect liveness of the image(s) and/or video(s). For example, as discussed above, one or more processor(s) 201 may track the movement of one or more features points on the 3D rendered image(s) or video(s) of the user. If the tracked movement exceeds a predetermined threshold, one or more processor(s) 201 may determine that the image(s) and/or video(s) of the user received is indeed "live." Additionally or alternatively, one or more processor(s) 201 may compare the tracked movement of the one or more feature points to already stored movement patterns of features points corresponding to various predetermined facial expressions or predetermined motions. For example, database 106 or database 212 may store a look-up table of predetermined movement patterns of feature points that correspond to a wink, movement of the head to the left, movement of the head to the right, and any other predetermined facial expressions or predetermined motions used to determine a liveness of the user's image(s) or video(s). As such, one or more processor(s) 201 may access the look-up table and compare the tracked movement of the one or more features points in the received image(s) or video(s) of the user in response to sending the request at block 1001. Based on the comparison, one or more processor(s) 201 may be configured to determine which predetermined motion or predetermined facial expression corresponds to the tracked movement of the one or more feature points in the received image(s) and/or video(s). Based on the determination, one or more processor(s) 201 may further determine whether the determined motion and/or facial expression corresponds with the motion and/or facial expression requested of the user at block 1001. If the determined motion and/or facial expression indeed corresponds with the motion and/or facial expression requested to the user at block 1001, one or more processor(s) 201 may determine that the received image(s) and/or video(s) is "live." If the determined motion and/or facial expression does not correspond with the motion and/or facial expression requested of the user at block 1001, one or more processor(s) 201 may determine that the received image(s) and/or video(s) is not "live," and thus, determine that the user is not an authorized user.

Once liveness of the image(s) and/or video(s) is determined, method 1000 proceeds to block 1005. At block 1005, one or more processor(s) 201 generate a notification indicative of whether the user in the received image(s) and/or video(s) is an authorized user. The step of generating a notification indicative of whether the user in the received image(s) and/or video(s) is an authorized user is discussed in detail above with respect to FIGS. 7 and 8.

It is further noted that the methods described herein may be implemented in software tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed by various components may be performed by other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A computer-implemented method of authenticating a user, the method comprising:
   receiving an image of a user of a device;
   identifying a facial descriptor of the user from the received image;
   determining a difference between the facial descriptor of the user from the received image and a facial descriptor of the user identified from a plurality of previously captured images of the user stored in the device;
   applying facial recognition to images stored in a social networking profile of a non-user associated with a social networking profile of the user to identify a facial descriptor of the non-user from the images stored in the social networking profile of the non-user;
   determining a difference between the facial descriptor of the non-user from the images stored in the social networking profile of the non-user and a facial descriptor of the non-user identified from the plurality of previously captured images of the user stored in the device; and
   authenticating the user in the received image, when the difference determined for the facial descriptor of the user and the difference determined for the facial descriptor of the non-user are lower than a predetermined threshold.

2. The computer-implemented method of claim 1, further comprising generating a notification that the user in the received image is the authorized user when the difference between the facial descriptor of the user from the previously captured images and the facial descriptor of the user from the received image is lower than the predetermined threshold.

3. The computer-implemented method of claim 2, further comprising enabling the user to perform a financial transaction when the difference is lower than the predetermined threshold, wherein the predetermined threshold varies based on a type of financial transaction requested by the user.

4. The computer-implemented method of claim 1, wherein at least one of the facial descriptor of the user or the facial descriptor of the non-user includes at least one of an eye, a nose, or a mouth.

5. The computer-implemented method of claim 1, wherein determining the difference between the facial descriptor of the user from the received image and the facial descriptor of the user identified from the plurality of previously captured images of the user further comprises:
   generating a first color histogram of the facial descriptor of the user from the received image; and
   comparing the first color histogram to second color histograms of the facial descriptor of the user identified from the plurality of previously captured images of the user.

6. The computer-implemented method of claim 1, wherein determining the difference between the facial descriptor of the user from the received image and the facial descriptor of the user identified from the plurality of previously captured images of the user further comprises:
   aligning the facial descriptor of the user from the received image with the facial descriptor of the user identified from the plurality of previously captured images of the user.

7. The computer-implemented method of claim 1, further comprising evaluating a liveness of the user by:
   requesting the user to make a predetermined facial expression;
   capturing a second image of the user while the user is making the predetermined facial expression; and
   performing a three-dimensional rendering of the second image.

8. The computer-implemented method of claim 1, wherein the difference between the facial descriptor of the user from the received image and the facial descriptor of the user identified from the plurality of previously captured images of the user is weighted higher than the identified facial descriptor of the non-user to determine whether the user in the received image is the authorized user.

9. The computer-implemented method of claim 2, wherein the notification comprises at least one of a visual notification or an audible notification.

10. The computer-implemented method of claim 2, wherein generating the notification further comprises at least one of:
    unlocking the device;
    enabling the user to access contents stored in the device; or
    enabling the user to perform a financial transaction.

11. A computer-implemented method of authenticating a user, the method comprising:
    receiving a video of a user of a device;
    separating the video into a plurality of image frames of the user;

identifying a facial descriptor of the user from the image frames;

determining a difference between the facial descriptor of the user from the image frames and a facial descriptor of the user identified from a plurality of previously captured images of the user stored in the device;

applying facial recognition to images stored in a social networking profile of a non-user associated with a social networking profile of the user to identify the facial descriptor of the non-user from the images stored in the social networking profile of the non-user;

determining a difference between the facial descriptor of the non-user from the images stored in the social networking profile of the non-user and a facial descriptor of the non-user identified from the plurality of previously captured images of the user stored in the device; and authenticating the user in the received image, when the difference determined for the facial descriptor of the user and the difference determined for the facial descriptor of the non-user are lower than a predetermined threshold.

12. The computer-implemented method of claim 11, further comprising generating a notification that the user in the video is the authorized user when the difference between the facial descriptor of the user from the previously captured images and the facial descriptor of the user from the image frames is lower than the predetermined threshold.

13. The computer-implemented method of claim 12, further comprising enabling the user to perform a financial transaction when the difference is lower than the predetermined threshold, wherein the predetermined threshold varies based on a type of financial transaction requested by the user.

14. The computer-implemented method of claim 11, wherein at least one of the facial descriptor of the user or the facial descriptor of the non-user includes at least one of an eye, a nose, or a mouth.

15. The computer-implemented method of claim 11, wherein determining the difference between the facial descriptor of the user from the image frames and the facial descriptor of the user identified from the plurality of previously captured images of the user further comprises:

generating a first color histogram of the facial descriptor of the user from the image frames; and comparing the first color histogram with second color histograms of the facial descriptor of the user identified from the plurality of previously captured images of the user.

16. The computer-implemented method of claim 11, wherein determining the difference between the facial descriptor of the user from the image frames and the facial descriptor of the user identified from the plurality of previously captured images of the user further comprises:

aligning the facial descriptor of the user from the image frames to the facial descriptor of the user identified from the plurality of previously captured images of the user.

17. The computer-implemented method of claim 11, further comprising evaluating a liveness of the user by:

requesting the user to perform a predetermined motion;

recording a second video of the user while the user is performing the predetermined motion;

separating the second video into a plurality of second image frames; and performing a three-dimensional rendering of the second image frames.

18. The computer-implemented method of claim 11, wherein the predetermined motion includes at least one of a predetermined head movement or a predetermined facial expression.

19. The computer-implemented method of claim 12, wherein generating the notification further comprises at least one of:

unlocking the device;

enabling the user to access contents stored in the device; or enabling the user to perform a financial transaction.

20. A system for authenticating a user, comprising:

at least one processor; and at least one memory storing instructions, wherein the instructions cause the processor to perform operations comprising:

receiving an image of a user of a device;

identifying a facial descriptor of the user from the received image;

determining a difference between the facial descriptor of the user from the received image and a facial descriptor of the user identified from a plurality of previously captured images of the user stored in the device;

applying facial recognition to images stored in a social networking profile of a non-user associated with a social networking profile of the user to identify the facial descriptor of the non-user from the images stored in the social networking profile of the non-user;

determining a difference between the facial descriptor of the non-user from the images stored in the social networking profile of the non-user and a facial descriptor of the non-user identified from the plurality of previously captured images of the user stored in the device; and authenticating the user in the received image, when the difference determined for the facial descriptor of the user and the difference determined for the facial descriptor of the non-user are lower than a predetermined threshold.

\* \* \* \* \*